(12) United States Patent
Huang et al.

(10) Patent No.: US 12,680,359 B2
(45) Date of Patent: Jul. 14, 2026

(54) CERAMIC GRILL HINGE STRUCTURE AND CERAMIC GRILL USING SAME

(71) Applicant: Yixing Xinpinyuan Ceramic Co., Ltd, Jiangsu (CN)

(72) Inventors: Xin Huang, Jiangsu (CN); Jing Chen, Jiangsu (CN)

( * ) Notice: Subject to any disclaimer, the term of this patent is extended or adjusted under 35 U.S.C. 154(b) by 207 days.

(21) Appl. No.: 18/427,500

(22) Filed: Jan. 30, 2024

(65) Prior Publication Data

US 2024/0287841 A1 Aug. 29, 2024

(30) Foreign Application Priority Data

Feb. 27, 2023 (CN) .......................... 202320320953.0

(51) Int. Cl.
*E05F 1/12* (2006.01)
*A47J 37/07* (2006.01)

(52) U.S. Cl.
CPC ............. *E05F 1/1261* (2013.01); *A47J 37/07* (2013.01); *E05Y 2900/308* (2013.01)

(58) Field of Classification Search
CPC ..... E05F 1/1261; E05F 1/1246; E05F 1/1253; E05F 1/1269; E05F 1/1276; E05D 11/1064; A47J 37/07; A47J 37/0786; E05Y 2900/308
See application file for complete search history.

(56) References Cited

U.S. PATENT DOCUMENTS

| | | | | |
|---|---|---|---|---|
| 2,726,914 A | * | 12/1955 | Allen | E05F 1/1261 |
| | | | | 312/405 |
| 2,911,667 A | * | 11/1959 | Burke | E05F 1/1261 |
| | | | | 16/290 |
| 3,103,693 A | * | 9/1963 | Tenniswood | E05F 1/1276 |
| | | | | 16/289 |
| 3,112,514 A | * | 12/1963 | Ostrom | E05F 1/1276 |
| | | | | 16/292 |
| 3,183,550 A | * | 5/1965 | Phelps | A45C 13/34 |
| | | | | 217/60 E |
| 3,187,374 A | * | 6/1965 | Lundell | E05F 1/1261 |
| | | | | 217/60 R |
| 3,771,194 A | * | 11/1973 | Little | E05F 1/1261 |
| | | | | 16/85 |

(Continued)

*Primary Examiner* — Jeffrey O'Brien

(74) *Attorney, Agent, or Firm* — Hawaii Patent Services; Nathaniel K. Fedde; Kenton N. Fedde

(57) ABSTRACT

Ceramic grill hinge structure and a ceramic grill using the same. The hinge structure comprises a hinge lower cover and a hinge upper cover, wherein lower connecting arms are symmetrically arranged on the two sides of the hinge lower cover; upper connecting arms are arranged on the two sides of the hinge upper cover corresponding to the lower connecting arms; the hinge upper cover is provided with a supporting shaft; the hinge lower cover is provided with an adjusting and supporting mechanism corresponding to the supporting shaft; the hinge lower cover is provided with an arc-shaped groove which can limit the maximum opening and closing angle of the hinge lower cover and the hinge upper cover; the ceramic grill comprises a grill body and a grill top cover; the hinge lower cover is connected with the grill body, and the hinge upper cover is connected with the grill top cover.

15 Claims, 12 Drawing Sheets

(56)          References Cited

U.S. PATENT DOCUMENTS

| | | | | | |
|---|---|---|---|---|---|
| 4,365,385 | A * | 12/1982 | Gotoh | E05D 5/0246 | |
| | | | | 16/382 | |
| 6,427,288 | B1 * | 8/2002 | Saito | F16M 11/105 | |
| | | | | 16/337 | |
| 6,453,804 | B1 * | 9/2002 | Lee | E05F 1/1261 | |
| | | | | 62/331 | |
| 6,463,923 | B2 * | 10/2002 | Carley | E05C 17/025 | |
| | | | | 126/41 R | |
| 6,684,456 | B2 * | 2/2004 | Lee | E05D 11/1078 | |
| | | | | 16/335 | |
| 6,766,563 | B2 * | 7/2004 | Lee | A23B 7/0425 | |
| | | | | 16/335 | |
| 6,928,698 | B2 * | 8/2005 | Chen | E05F 1/1261 | |
| | | | | 16/335 | |
| 7,261,100 | B2 * | 8/2007 | Bartmann | F24C 15/026 | |
| | | | | 126/192 | |
| 7,406,747 | B2 * | 8/2008 | Chol | E05D 11/08 | |
| | | | | 16/257 | |
| 8,850,660 | B2 * | 10/2014 | Kim | G03G 15/605 | |
| | | | | 16/296 | |
| 8,973,218 | B2 * | 3/2015 | Yabukoshi | E05F 1/1261 | |
| | | | | 16/281 | |
| 10,754,285 | B2 * | 8/2020 | Kondo | E05F 3/20 | |
| 10,781,621 | B2 * | 9/2020 | Kondo | G03G 21/1633 | |
| 10,788,785 | B2 * | 9/2020 | Kondo | G03G 21/1633 | |
| 10,822,851 | B2 * | 11/2020 | Graham | A47J 37/0786 | |
| 10,954,705 | B2 * | 3/2021 | Ma | A47J 37/0786 | |
| 11,142,934 | B2 * | 10/2021 | Graham | E05F 1/1058 | |
| 11,147,417 | B2 * | 10/2021 | Feng | A47J 37/0786 | |
| 11,510,524 | B2 * | 11/2022 | Pruitt | A47J 36/04 | |
| 12,247,427 | B2 * | 3/2025 | Thomas | E05D 3/18 | |
| 2005/0081721 | A1 * | 4/2005 | Craycraft | A47J 37/0718 | |
| | | | | 99/450 | |
| 2025/0354647 | A1 * | 11/2025 | Lee | F16M 11/10 | |

* cited by examiner

CERAMIC GRILL HINGE STRUCTURE AND CERAMIC GRILL USING SAME

CROSS-REFERENCE TO RELATED APPLICATION

This application claims priority to China Patent Application 2023203209530 filed Feb. 27, 2023, the contents of which are hereby incorporated by reference in their entirety.

TECHNICAL FIELD

The present invention relates to the technical field of grills, in particular to a ceramic grill hinge structure and a ceramic grill using the same.

BACKGROUND

At present, more and more consumers prefer barbecue, which promotes the rapid development of grill technology. Among them, the ceramic grill occupies an important position in the market because of its unique advantages. The ceramic grill has thick wall, excellent air tightness, and heat is not easy to be lost. It has the functions of rapid temperature rise, constant temperature and reflection of thermal radiation. Compared with the traditional iron carbon grill and gas grill, the ceramic grill can significantly shorten the cooking time and ensure that the ingredients are evenly cooked.

The top cover of the existing ceramic grill and the furnace body are usually connected by a hinge structure. In the process of using the existing ceramic grill, it is found that although the hinge structure can ensure the free opening and closing of the top cover, due to the high density and heavy weight of the ceramic material itself, the top cover can not stay at a specific angle when it is opened. Therefore, how to solve the problem that the top cover is difficult to suspend when being opened and closed while maintaining the excellent performance of the ceramic grill is the direction that the industry needs to study deeply.

For example, in the patent document with publication number of U.S. Pat. No. 10,954,705B2, a grill damping hinge is introduced in detail. The grill damping hinge comprises a C-shaped hinge lower cover having a cavity and a hinge upper cover covering the top of the hinge lower cover, the hinge upper cover and the hinge lower cover being connected via an opening-and-closing shaft penetrating an overlapping portion of two covers; wherein: a top of the hinge lower cover and the overlapping portion of the upper cover are provided with arcuate grooves, and both ends provided with an upper cover shaft are passed through the arcuate grooves and penetrate the hinge upper cover, the upper cover shaft is sleeved with an upper cover shaft pressing rod; two bottom sides of the hinge lower cover, which are not the overlapping portion of the hinge upper cover, are provided with a groove provided with a lower cover fixed shaft inserted in the groove and parallel to the upper cover shaft pressing rod, a spring shaft is fixed between the upper cover shaft pressing rod and the lower cover fixed shaft, and the spring shaft is penetratingly provided with a hinge spring; the hinge upper cover at the position of the hinge lower cover cavity are respectively provided at two sides of hinge upper cover ears integrally formed with the hinge upper cover, the hinge upper cover ear is provided with a plurality of hinge upper cover ear holes; two sides of the cavity of the hinge lower cover, which are not the overlapping portion of the hinge upper cover, are respectively provided with a hinge lower cover adjusting hole, and provided with the hinge lower cover adjusting ear is fixed on the hinge lower cover through the hinge lower cover adjusting holes, the hinge lower cover adjusting ear is provided with a plurality of hinge lower cover ear holes; angles are respectively formed between the hinge upper cover ear and the side of the hinge upper cover, and the hinge lower cover adjusting ear and the side of the hinge lower cover.

Because the damping hinge of the grill adopts the design of double shafts and double springs, and the hinge ears can be adjusted back and forth, it can be easily adjusted when the grill body and the grill cover are different in size, so the sealing effect is good; when the grill cover is opened and closed, it can stay at any angle from 0 to 58, which avoids the risk caused by accidental fall of the furnace cover and has higher safety performance; at the same time, it has beautiful appearance, high temperature resistance and convenient component.

However, there are many problems in this kind of hinge that need to be improved. For example, two bottom sides of the hinge lower cover, which are not the overlapping portion of the hinge upper cover, are provided with a groove, and the main function of this groove is to install the lower cover fixed shaft, and the lower cover fixed shaft is also provided with a notch that is stuck into the groove. These designs will cause stress concentration, which will make part of the lower cover fixed shaft near the groove and easy to break. Moreover, because the hinge upper cover wraps the hinge lower cover, the arc-shaped groove is blocked by the hinge upper cover, so the movable range of the hinge is not easy to be viewed, and the damage of the arc-shaped groove can hardly be found in time, which has certain defects and hidden dangers. At the same time, because the hinge upper cover wraps the hinge lower cover, the hinge upper cover and the hinge lower cover are not in the same plane, the installation position of the hinge upper cover adjusting ears is in the same plane as the hinge upper cover, and the hinge lower cover adjusting ears are installed on the inner side of the hinge lower cover. Therefore, the adjusting ears of the hinge upper cover and the adjusting ears of the hinge lower cover need to be changed in shape to appear on the same plane, so as to better match the ceramic grill; secondly, because the opening and closing shaft of the upper cover runs through the hinge upper cover, space needs to be reserved for the opening and closing shaft of the upper cover inside the hinge to avoid interference between the opening and closing shaft of the upper cover and other internal components; although the lower cover adjusting ear is provided with a plurality of hinge lower cover ear holes, and the hinge upper cover ear is provided with a plurality of hinge upper cover ear holes, the arrangement of these holes is almost in a straight line, which is prone to cause uneven distribution of stress points in actual use, resulting in deformation or even fracture of the hinge; in addition, because two springs are arranged, the installation difficulty will be improved due to the elastic force of the springs during installation; finally, it was also found that the adjusting shaft may hurt people after it comes out in some unexpected situations. Although the upper cover shaft pressuring rod can prevent the adjusting shaft from coming out to some extent, it cannot fundamentally solve this problem.

Therefore, based on the above problems, a brand-new ceramic grill hinge structure is proposed. The hinge structure adopts a new component structure, cancels the groove and uses a single spring. The upper cover is embedded in the lower cover, and the connecting shaft between the upper cover and the lower cover adopts a non-penetrating design. The connecting holes on the connecting arm connected with the grill are not arranged in a straight line, the centers of the three connecting holes are triangular, and a safety nut is added at the end of the adjusting shaft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provide a ceramic grill hinge structure, which includes a hinge upper cover, a hinge lower cover rotatably engaged with the hinge upper cover, and an adjusting and supporting mechanism arranged between the hinge upper cover and the hinge lower cover;

wherein, the hinge upper cover comprises a supporting shaft, at least one rotatable shaft sleeve is arranged on the supporting shaft, and the hinge lower cover is provided with at least two arc-shaped grooves, and the two arc-shaped grooves receive the two ends of the supporting shaft and allow the two ends of the supporting shaft to move therein; and wherein the adjusting and supporting mechanism comprises an adjusting component and an elastic member, wherein the adjusting component comprises an adjusting shaft with a threaded part and an adjusting member arranged on the adjusting shaft, wherein the adjusting shaft further comprises a supporting part, wherein one end of the elastic member is pressed against the adjusting member, and the other end of the elastic member is pressed against the hinge lower cover; and wherein, the supporting part is provided with a limiting groove which receives and supports the shaft sleeve, and the adjusting member is operable to change an elastic force of the elastic member.

The present invention further provides a ceramic grill, which includes a grill body, a grill top cover, and a hinge structure connecting the grill body and the grill top cover;

wherein, the hinge structure comprises a hinge upper cover, a hinge lower cover rotatably engaged with the hinge upper cover, and an adjusting and supporting mechanism arranged between the hinge upper cover and the hinge lower cover; wherein, the hinge upper cover comprises a supporting shaft and at least one upper connecting arm, at least one rotatable shaft sleeve is arranged on the supporting shaft, and the hinge lower cover comprises at least one lower connecting arm and is provided with at least two arc-shaped grooves, and the two arc-shaped grooves receive the two ends of the supporting shaft and allow the two ends of the supporting shaft to move therein; and wherein the adjusting and supporting mechanism comprises an adjusting component and an elastic member, wherein the adjusting component comprises an adjusting shaft with a threaded part and an adjusting member arranged on the adjusting shaft, wherein the adjusting shaft further comprises a supporting part, wherein one end of the elastic member is pressed against the adjusting member, and the other end of the elastic member is pressed against the hinge lower cover; and wherein, the supporting part is provided with a limiting groove which receives and supports the shaft sleeve, and the adjusting member is operable to change an elastic force of the elastic member;

wherein, the hinge structure is detachably attached to the grill top cover through the upper connecting arm, and the hinge structure is detachably attached to the grill body through the lower connecting arm.

The present invention further provides a cooking method, which includes: providing a ceramic grill, the ceramic grill comprising a grill body, a grill top cover, and a hinge structure connecting the grill body and the grill top cover; wherein, the hinge structure comprises a hinge upper cover, a hinge lower cover rotatably engaged with the hinge upper cover, and an adjusting and supporting mechanism arranged between the hinge upper cover and the hinge lower cover; wherein, the hinge lower cover comprises at least one lower connecting arm; the adjusting and supporting mechanism comprises an adjusting component and an elastic member, wherein the adjusting component comprises an adjusting shaft with a threaded part and an adjusting member arranged on the adjusting shaft, wherein the adjusting shaft further comprises a supporting part, wherein one end of the elastic member is pressed against the adjusting member, and the other end of the elastic member is pressed against the hinge lower cover; and wherein, the adjusting member is operable to change an elastic force of the elastic member; the adjusting member comprises an adjusting nut arranged below the supporting part and a gland arranged below the adjusting nut; and the hinge structure is detachably attached to the grill top cover through the upper connecting arm, and the hinge structure is detachably attached to the grill body through the lower connecting arm; and wherein a barbecue method comprises the following steps:

connecting the hinge structure with the ceramic grill;
opening the ceramic grill;
putting food into the ceramic grill; and
heating the ceramic grill.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
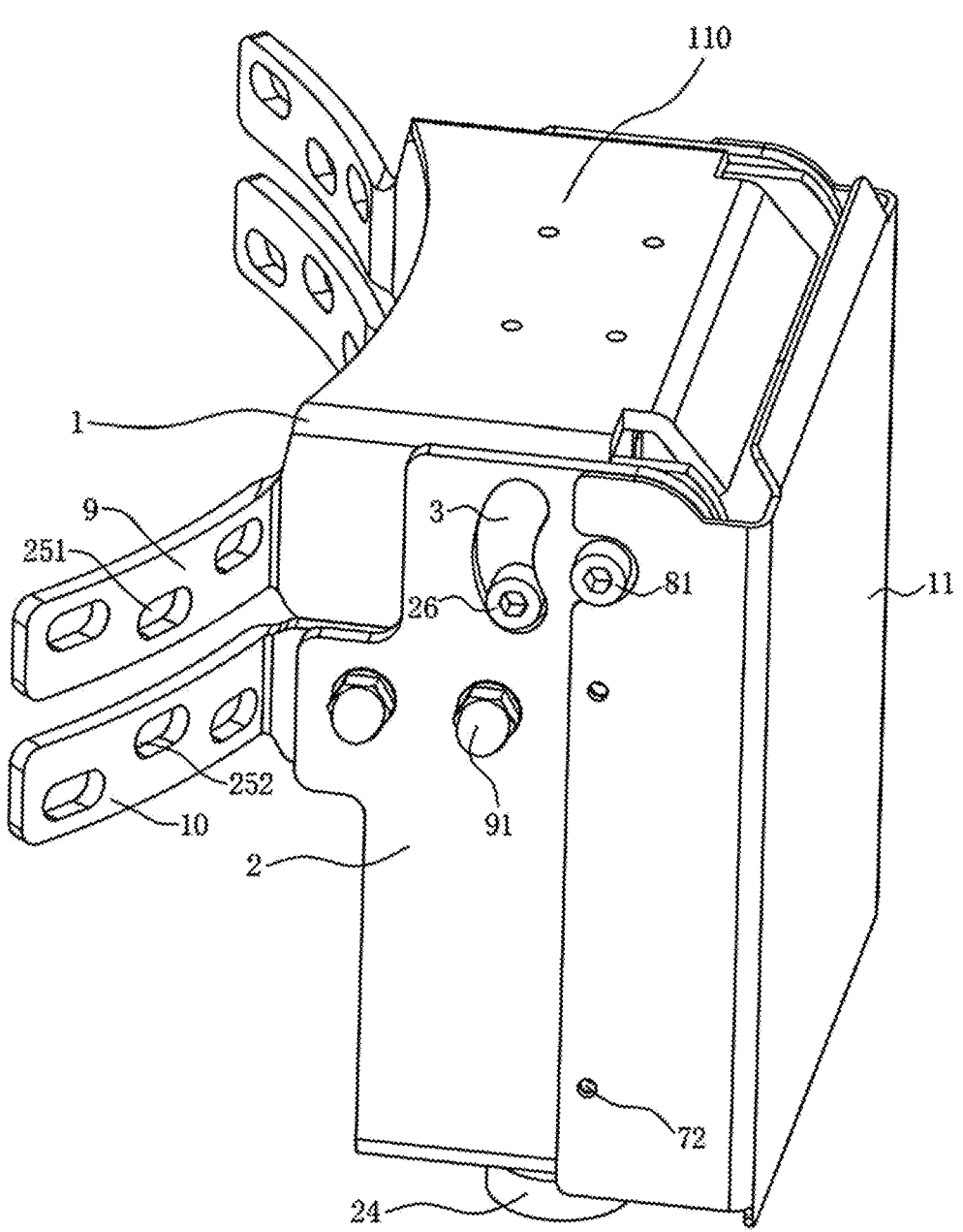
FIG. 1 is a schematic perspective view of a hinge structure.
Figure 2:
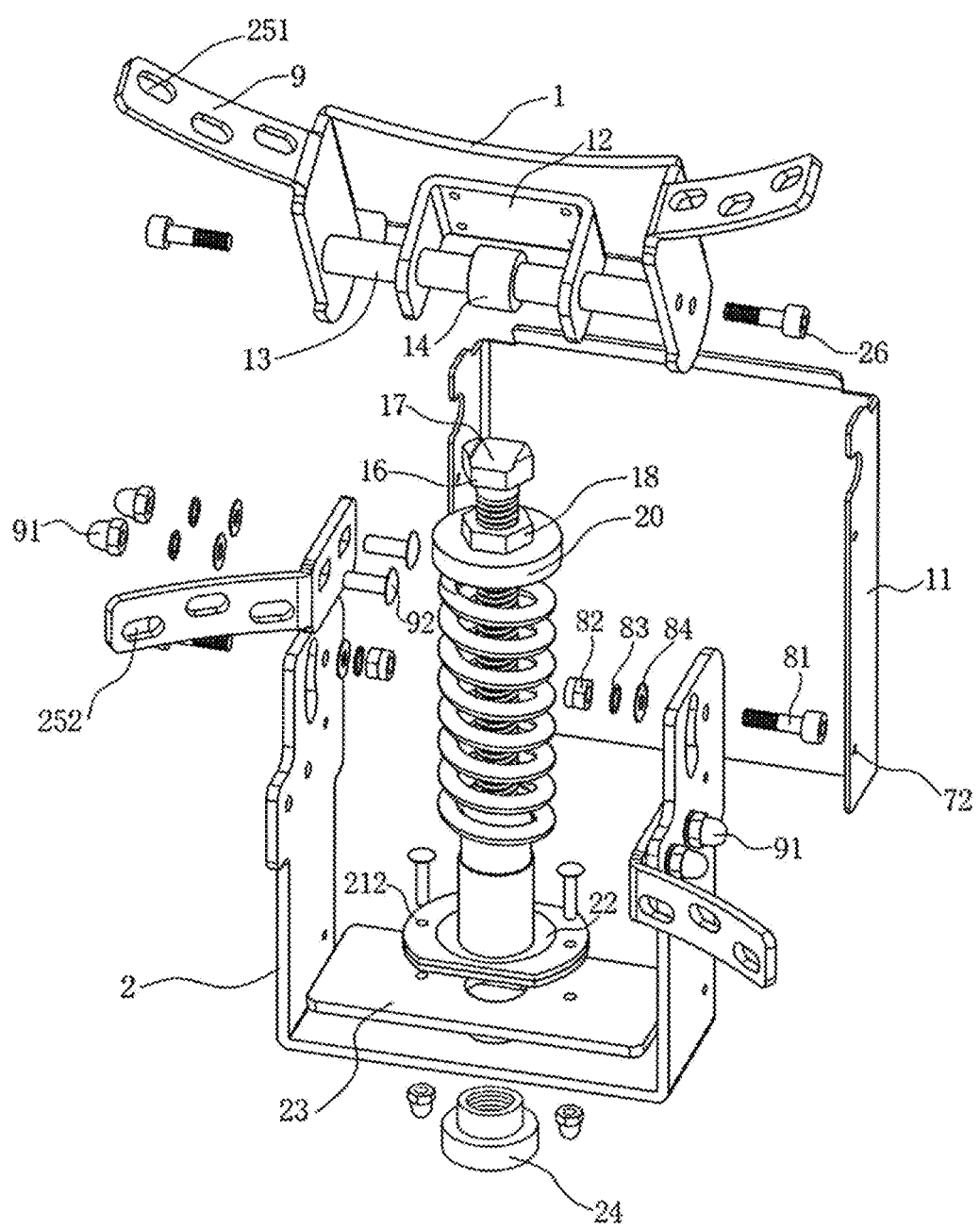
FIG. 2 is an explosion schematic diagram of the hinge structure.
Figure 3:
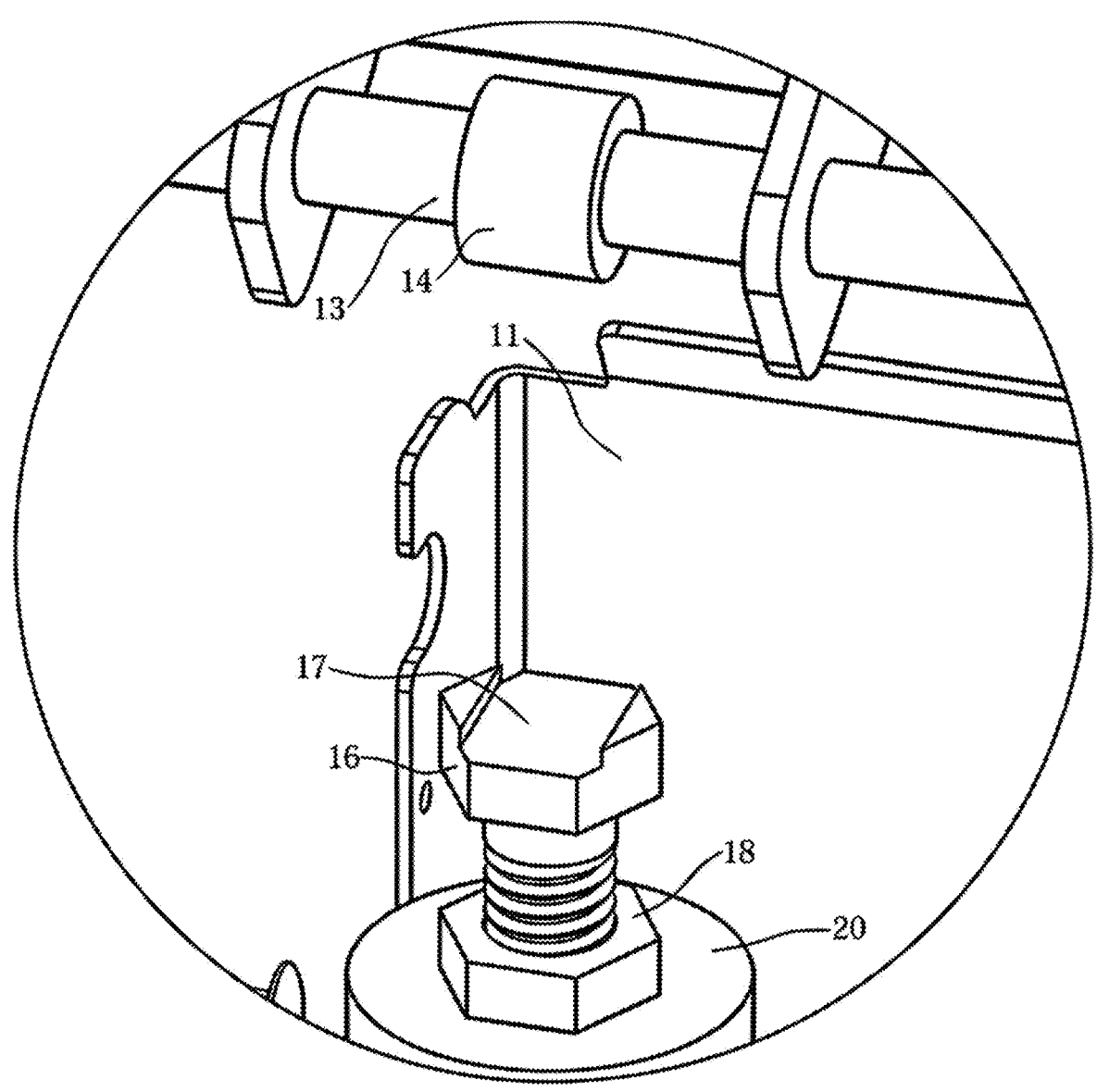
FIG. 3 is a partially enlarged schematic view at B in FIG. 2.
Figure 4:
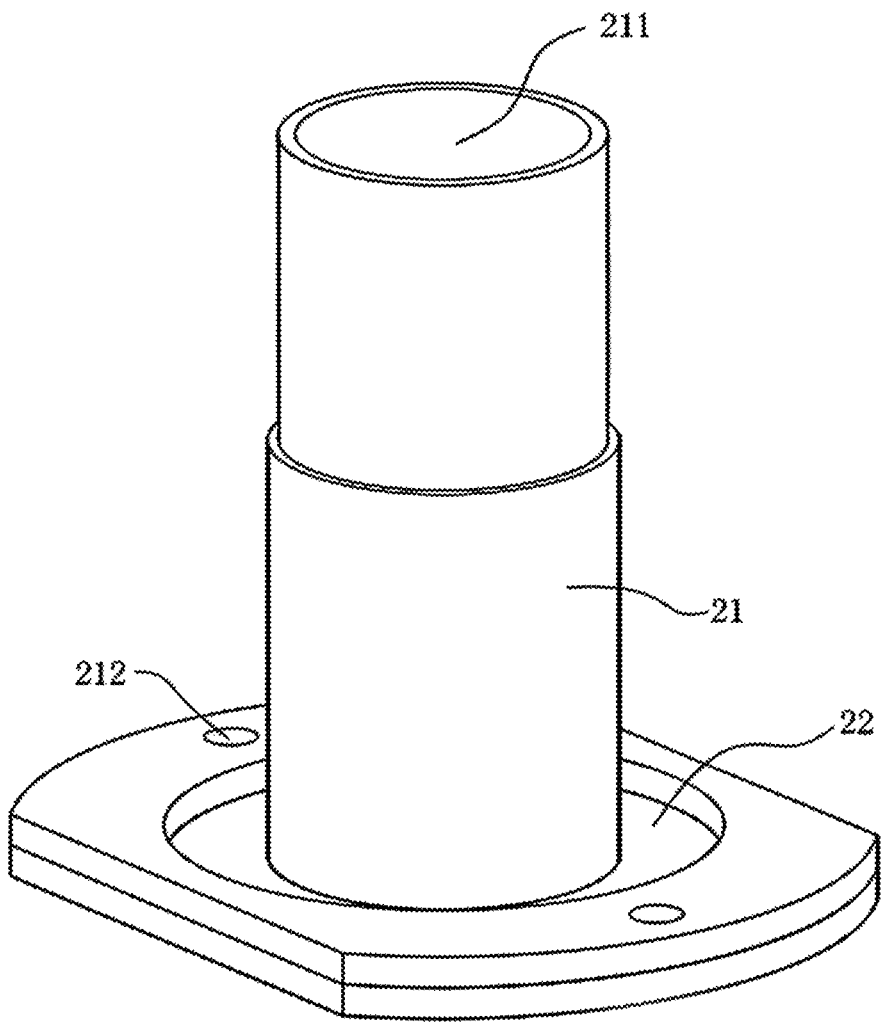
FIG. 4 is a perspective view of the spring base.
Figure 5:
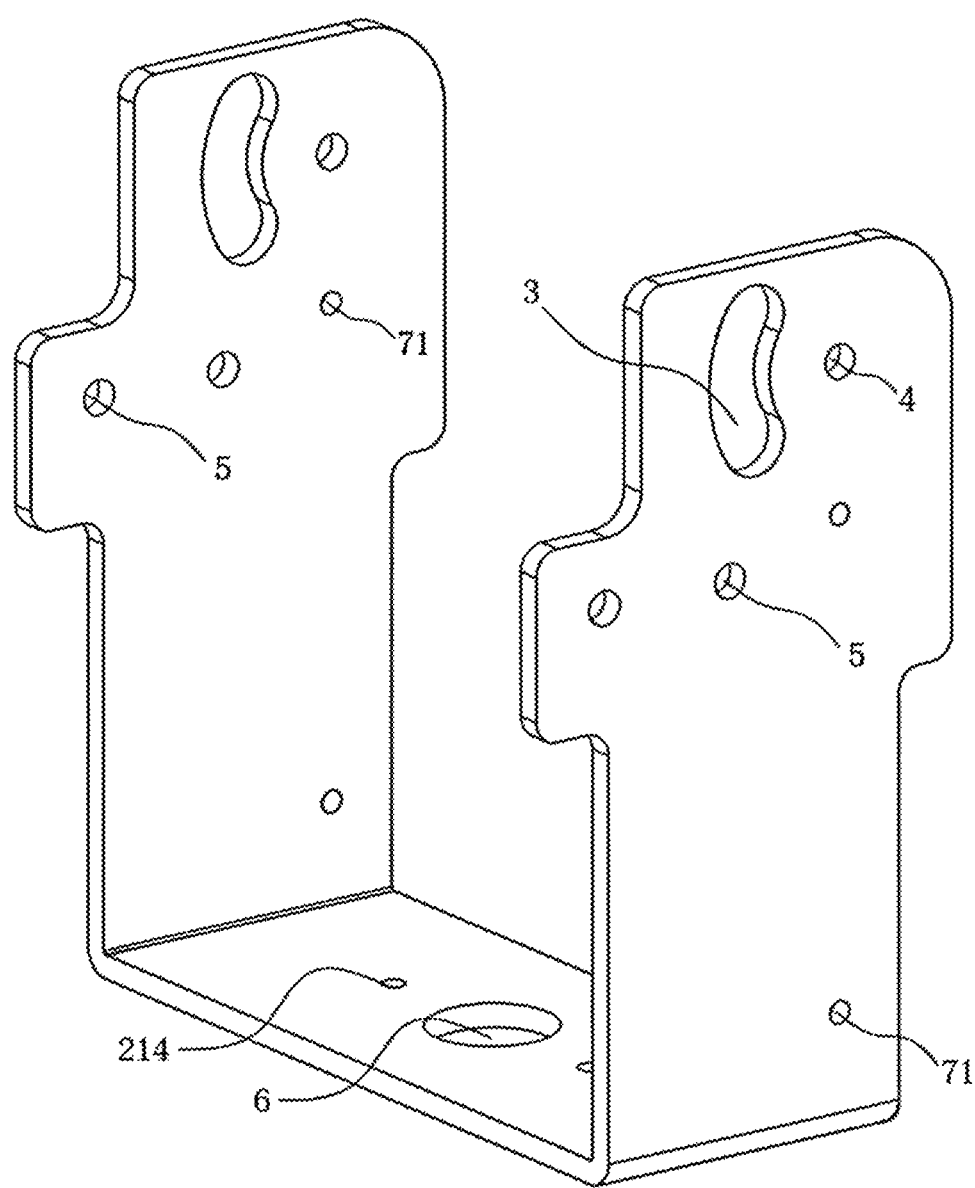
FIG. 5 is a schematic perspective view of the hinge lower cover.
Figure 6:
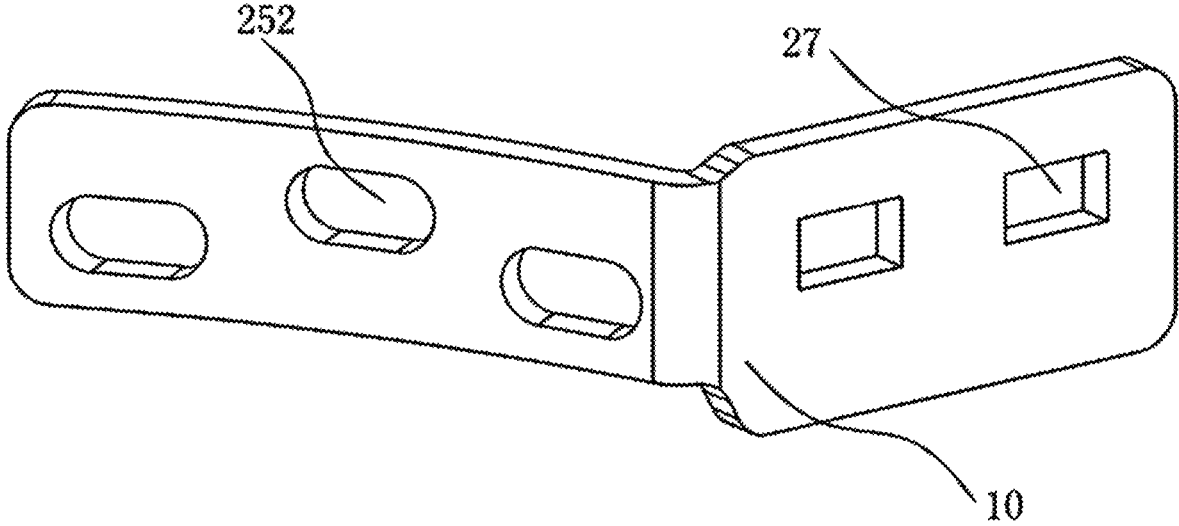
FIG. 6 is a schematic perspective view of the lower connecting arm.

Hinge upper cover (1); Upper stopper (110); Hinge lower cover (2); Arc-shaped groove (3); Upper cover connecting hole (4); Lower arm mounting hole (5); Adjusting shaft through hole (6); First protective cover mounting hole (71); Second protective cover mounting hole (72); Hinge connector (8); Connecting bolt (81); Connecting nut (82); Spring pad (83); Flat pad (84); Upper connecting arm (10); Lower connecting arm (9); Lower arm fastening nut (91); Lower arm fastening bolt (92); Protective cover (11); Reinforcing beam (12); Supporting shaft (13); Shaft sleeve (14); Adjusting shaft (15); Supporting part (16); Limiting groove (17); Adjusting nut (18); Elastic member (19); Gland (20); Spring base (21); Base through hole (211); First base fastening hole (212); Base fastener (213); Second base fastening hole (214); Spring limiting groove (22); Reinforcing pad (23); Safety nut (24); First grill connecting hole (251); Second grill connecting hole (252); Supporting shaft nut (26); Lower arm adjusting hole (27); Grill body (28); Grill top cover (29).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 8, the present invention provides a ceramic grill hinge structure, which includes a hinge lower cover 2 and a hinge upper cover 1, wherein the hinge upper cover 1 is rotatably connected to the hinge lower cover 2 through a hinge connector 8, and the hinge lower cover 2 is provided with an upper cover connecting hole 4, and the hinge connector 8 includes a connecting bolt 81, a connecting nut 82, a flat pad 84 and a spring pad 83.

In this embodiment, the connecting nut 82 is inside the hinge lower cover 2, the connecting bolt 81 is outside the hinge lower cover 2, and the flat pad 84 and the spring pad 83 are arranged between the connecting nut 82 and the inside of the hinge lower cover 2.

In another embodiment, the connecting nut 82 is outside the hinge lower cover 2, the connecting bolt 81 is inside the hinge lower cover 2, and the flat pad 84 and the spring pad 83 are arranged between the connecting nut 82 and the outside of the hinge lower cover 2.

In another embodiment, the connecting nut 82 is inside the hinge lower cover 2, the connecting bolt 81 is outside the hinge lower cover 2, and the flat pad 84 and the spring pad 83 are arranged between the connecting bolt 81 and the outside of the hinge lower cover 2.

In another embodiment, the connecting nut 82 is outside the hinge lower cover 2, the connecting bolt 81 is inside the hinge lower cover 2, and the flat pad 84 and the spring pad 83 are arranged between the connecting nut 82 and the outside of the hinge lower cover 2.

In this embodiment, two sides of the hinge lower cover 2 are symmetrically provided with lower connecting arms 9, and two sides of the hinge upper cover 1 are provided with upper connecting arms 10 corresponding to the lower connecting arms 9. The width of the two sides of the hinge upper cover 1 is smaller than that of the hinge lower cover 2, and the hinge upper cover 1 is partially covered by the hinge lower cover 2, so that when the lower connecting arm 9 and the upper connecting arm 10 are in the closest position to each other, the lower connecting arm 9 and the upper connecting arm 10 are on the same plane. Therefore, in structural design, the upper and lower connecting arms 9 and 10 have similar shapes, which are close to the fitting degree and installation position of the grill and more convenient for production and installation.

In another embodiment, the two lower connecting arms 9 are connected from the left side to the right side and integrated, and the two upper connecting arms 10 are connected from the left side to the right side and integrated corresponding to the lower connecting arms 9.

The lower connecting arm 9 and the hinge lower cover 2 are connected through a lower arm fastening nut 91 and a lower arm fastening bolt 92. The lower connecting arm 9 is provided with a lower arm adjusting hole 27 which is a rectangular through hole, and the hinge lower cover 2 is provided with the lower arm mounting hole 5 which is a circular through hole.

In this embodiment, the width of the lower arm adjusting hole 27 is larger than that of the lower arm mounting hole 5, and the lower connecting arm 9 can be moved and adjusted in the width direction of the lower arm adjusting hole 27 by loosening the lower arm fastening bolt 92 and the lower arm fastening nut 91 to adapt to ceramic grills with different sizes and shapes.

In another embodiment, the width of the lower arm mounting hole 5 is larger than that of the lower arm adjusting hole 27, and the lower connecting arm 9 can be moved and adjusted in the width direction of the lower arm mounting hole 5 by loosening the lower arm fastening bolt 92 and the lower arm fastening nut 91 to adapt to ceramic grills with different sizes and shapes.

In another embodiment, the width of the lower arm adjusting hole 27 is larger than that of the lower arm mounting hole 5, and the lower arm adjusting hole 27 is a rectangular through hole, and the lower arm mounting hole 5 is also a rectangular through hole. Therefore, by loosening the lower arm fastening bolt 92 and the lower arm fastening nut 91, the lower connecting arm 9 can be moved and adjusted in the width direction of the lower arm adjusting hole 27 to adapt to ceramic grills with different sizes and shapes.

In another embodiment, the width of the lower arm adjusting hole 27 is larger than that of the lower arm mounting hole 5, and the lower arm adjusting hole 27 is a circular through hole, and the lower arm mounting hole 5 is also a circular through hole. Therefore, by loosening the lower arm fastening bolt 92 and the lower arm fastening nut 91, the lower connecting arm 9 can be moved and adjusted in the width direction of the lower arm adjusting hole 27 to adapt to ceramic grills with different sizes and shapes.

An upper connecting arm 10 is provided with at least three first grill connecting holes 251, and the center points of all the first grill connecting holes 251 on an upper connecting arm 10 are not on the same straight line. A lower connecting arm 9 is provided with at least three second grill connecting holes 252, and the center points of all the second grill connecting holes 252 on a lower connecting arm 9 are not on the same straight line. The first grill connecting hole 251 and the second grill connecting hole 252 can be used for connecting the hinge structure with the ceramic grill, the first grill connecting hole 251 is used for connecting the top cover of the ceramic grill, and the second grill connecting hole 252 is used for connecting the lower part of the ceramic grill, and the opening and closing of the hinge structure drives the opening and closing of the upper part and the lower part of the ceramic grill.

In this embodiment, an upper connecting arm 10 has three first grill connecting holes 251, the center points of which form an inverted triangle, while a lower connecting arm 9 has three second grill connecting holes 252, and the center points of the three second grill connecting holes 252 for a triangle.

In another embodiment, an upper connecting arm 10 has three first grill connecting holes 251, and the center points of the three first grill connecting holes 251 form an inverted triangle, while a lower connecting arm 9 has three second grill connecting holes 252, and the center points of the three second grill connecting holes 252 form an inverted triangle.

In another embodiment, an upper connecting arm 10 has three first grill connecting holes 251, and the center points of the three first grill connecting holes 251 form a triangle, while a lower connecting arm 9 has three second grill connecting holes 252, and the center points of the three second grill connecting holes 252 form an inverted triangle.

In another embodiment, an upper connecting arm 10 has three first grill connecting holes 251, and the center points of the three first grill connecting holes 251 form a triangle, while a lower connecting arm 9 has three second grill connecting holes 252, and the center points of the three second grill connecting holes 252 form a triangle.

The two sides of the hinge lower cover 2 are provided with arc-shaped grooves 3, and the hinge upper cover 1 is internally provided with a supporting shaft 13 corresponding to the arc-shaped grooves 3. Both ends of the supporting shaft 13 are provided with supporting shaft nuts 26 which are located in the arc-shaped grooves 3, and the maximum opening and closing angle of the hinge lower cover 2 and the hinge upper cover 1 is limited by the arc-shaped grooves 3. A reinforcing beam 12 is connected between the supporting shaft 13 and the hinge upper cover 1, which can disperse the pressure of the supporting shaft 13 on the hinge upper cover 1 and improve the strength and safety of the hinge structure.

Because the arc-shaped grooves 3 are arranged on both sides of the hinge lower cover 2, it is easy to see the arc-shaped grooves 3, and it can be clearly known whether the hinge structure has reached the maximum opening and closing angle and cannot be further opened and closed, and it can also be found in time when the arc-shaped groove 3 has structural damage, thus improving the use experience and safety.

In this embodiment, the opening and closing angle of the hinge structure is 0-60 degrees.

Figure 7:
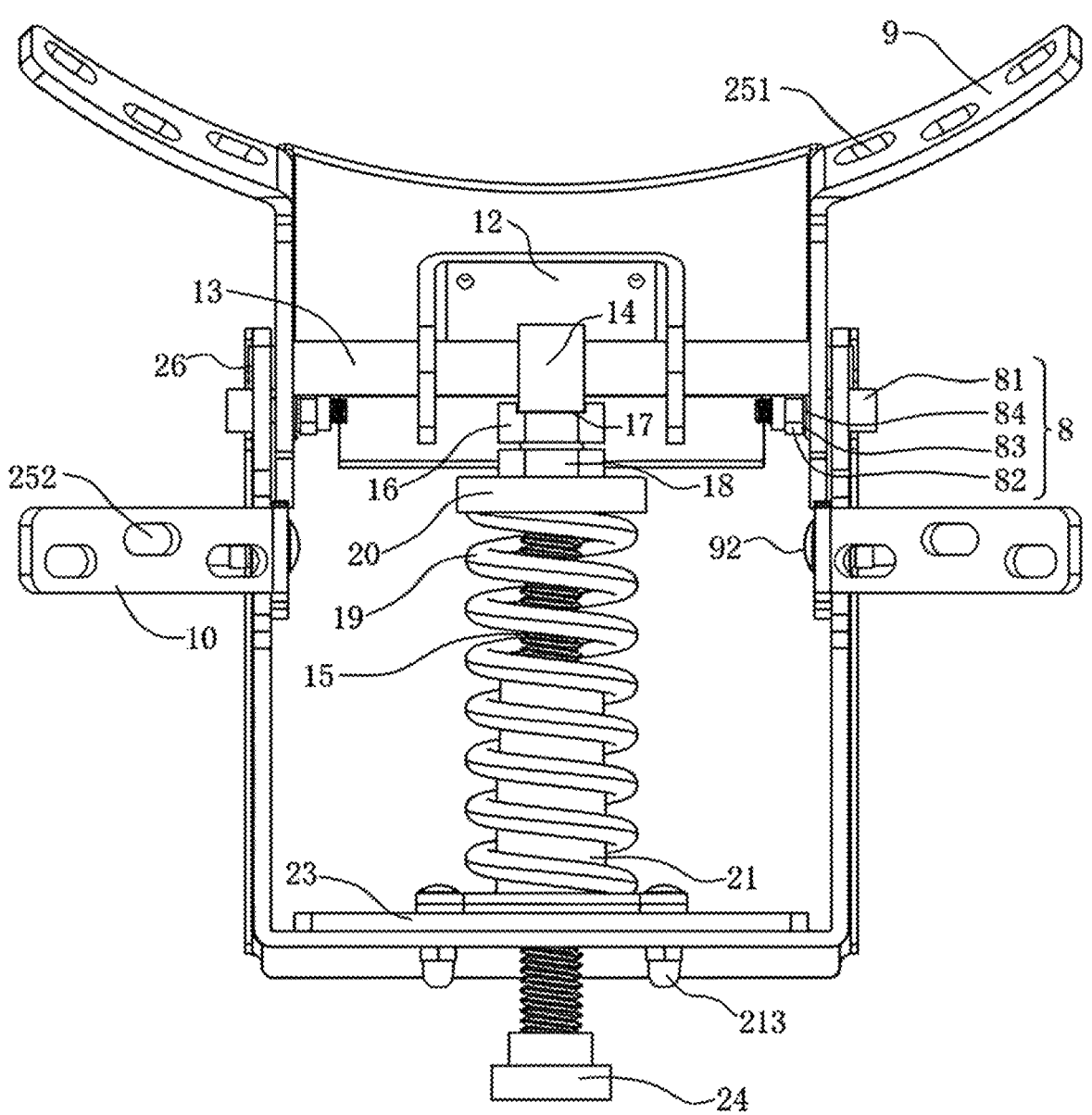
FIG. 7 is a schematic perspective view of the hinge structure.
Figure 8:
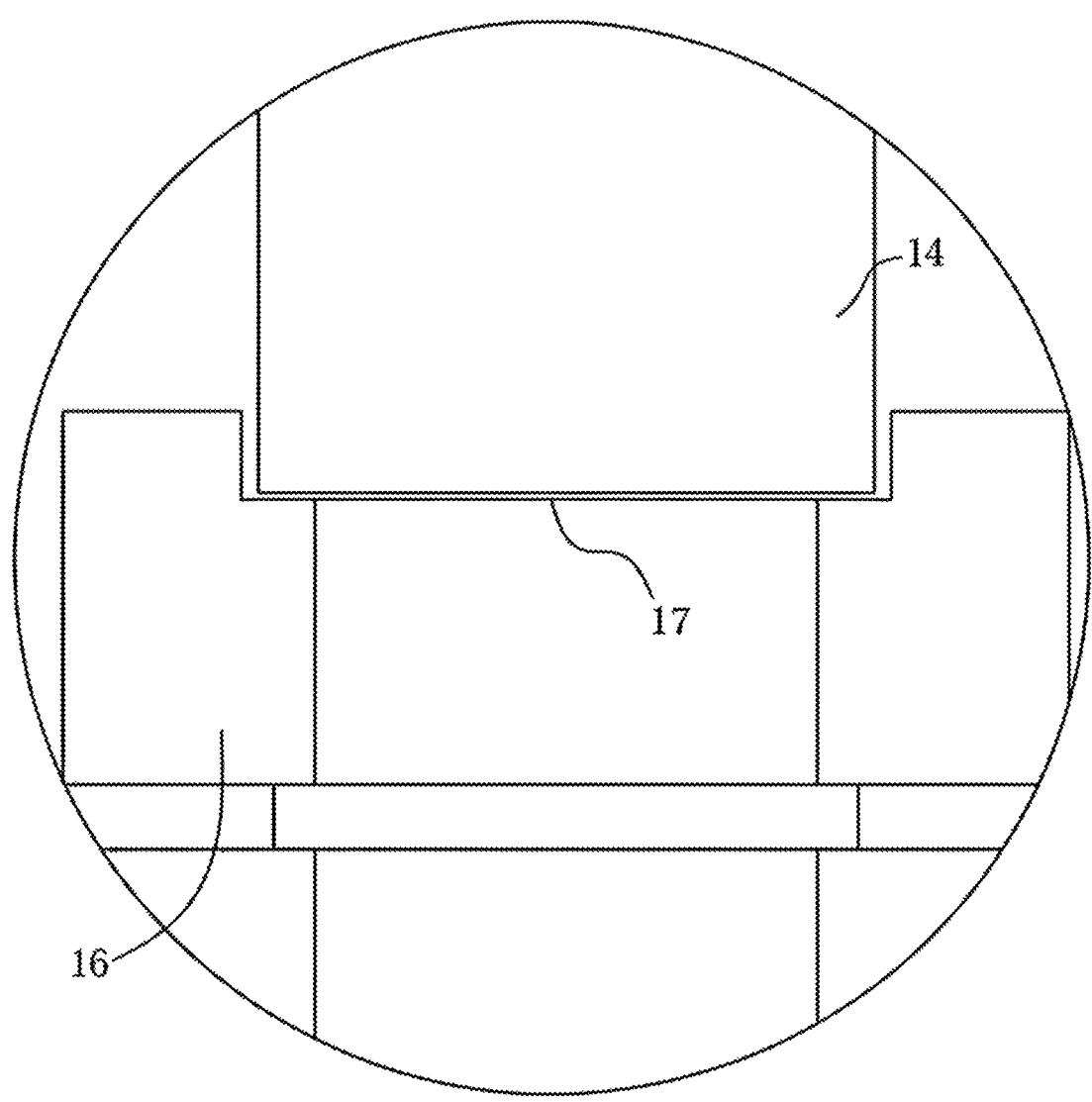
FIG. 8 is a partially enlarged schematic view at A in FIG. 7.
Figure 9:
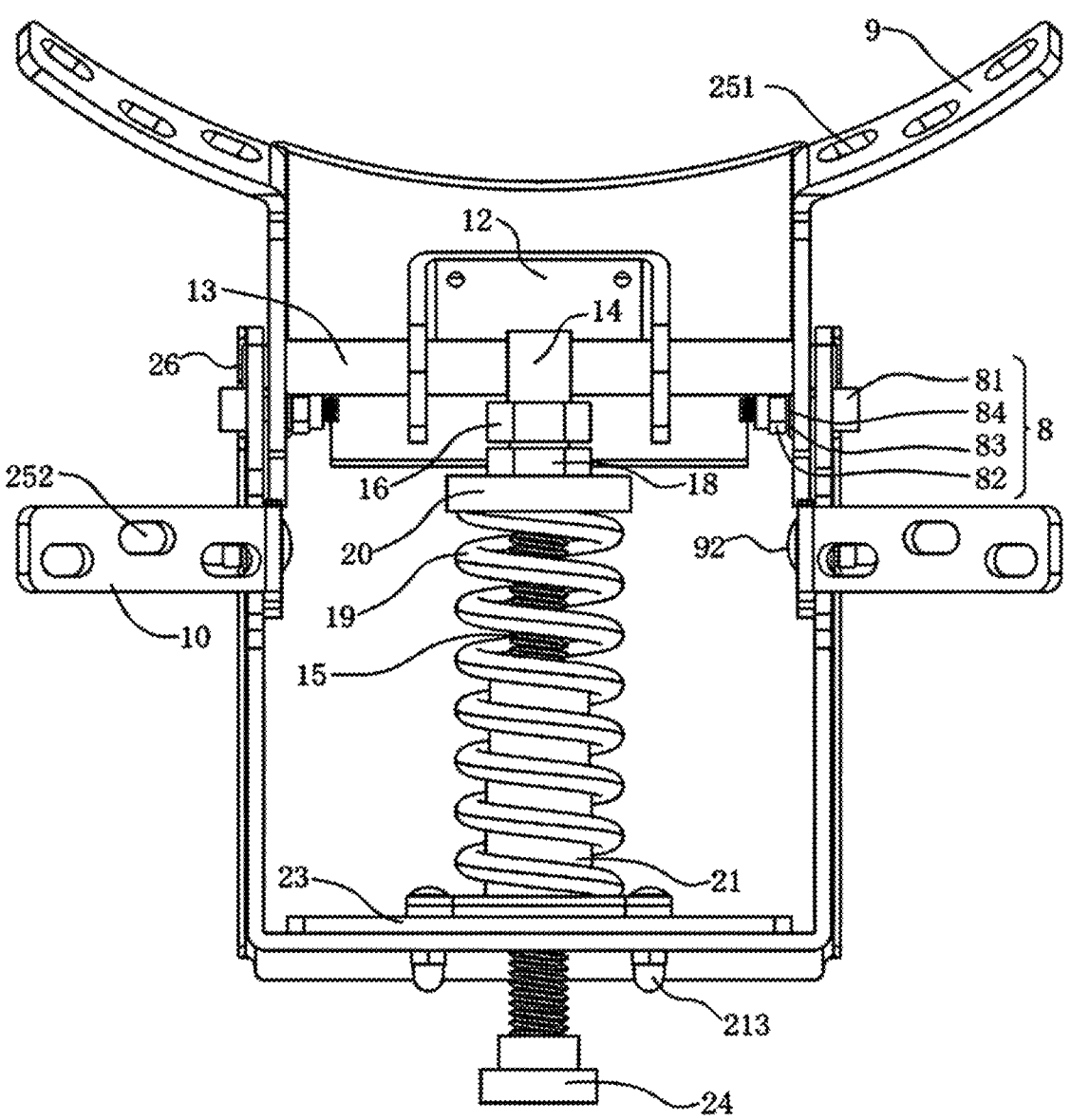
FIG. 9 is a schematic view of the hinge structure of another embodiment viewed from the front.
Figure 10:
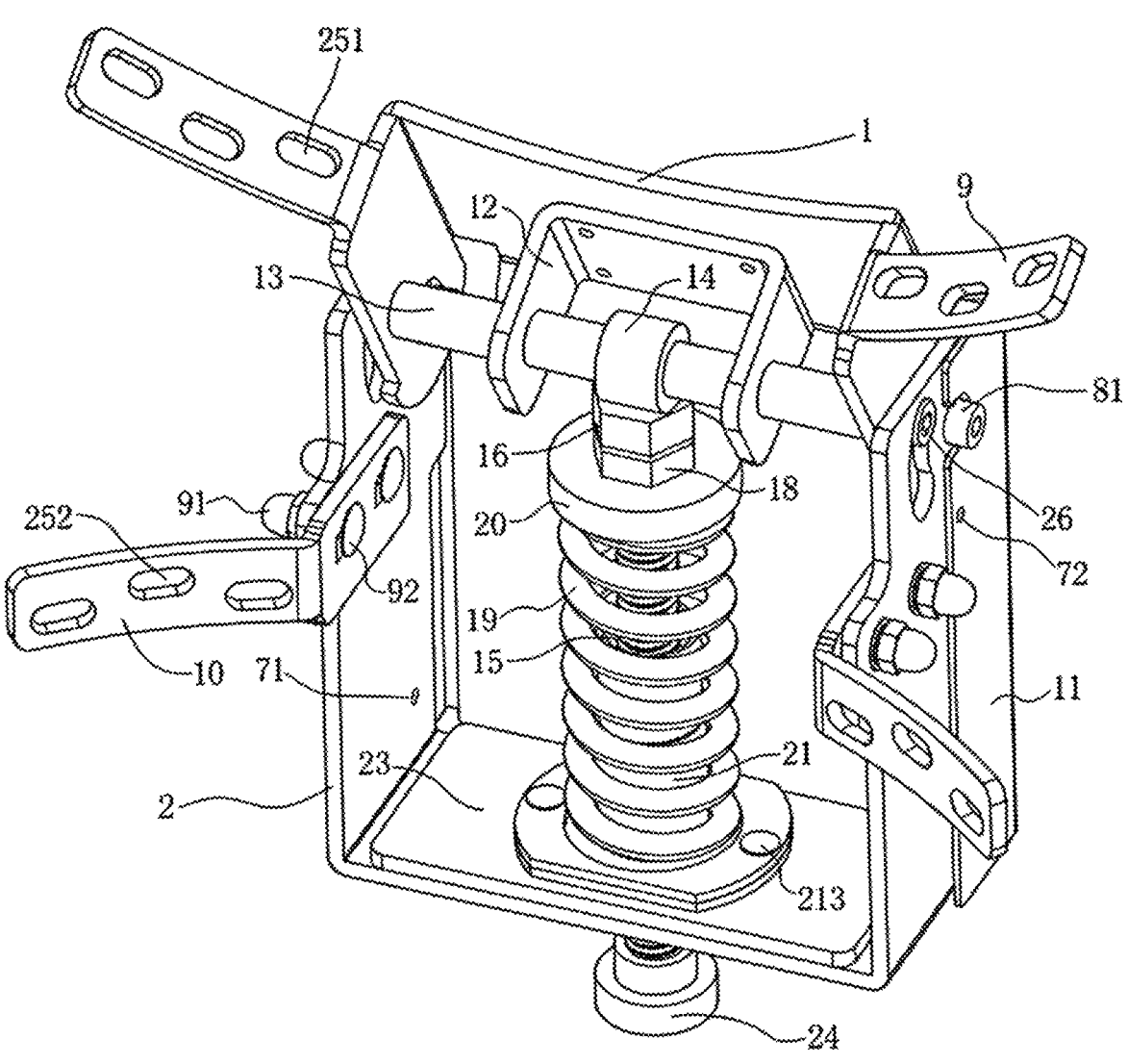
FIG. 10 is a perspective view of the hinge structure of another embodiment from another angle.
Figure 11:
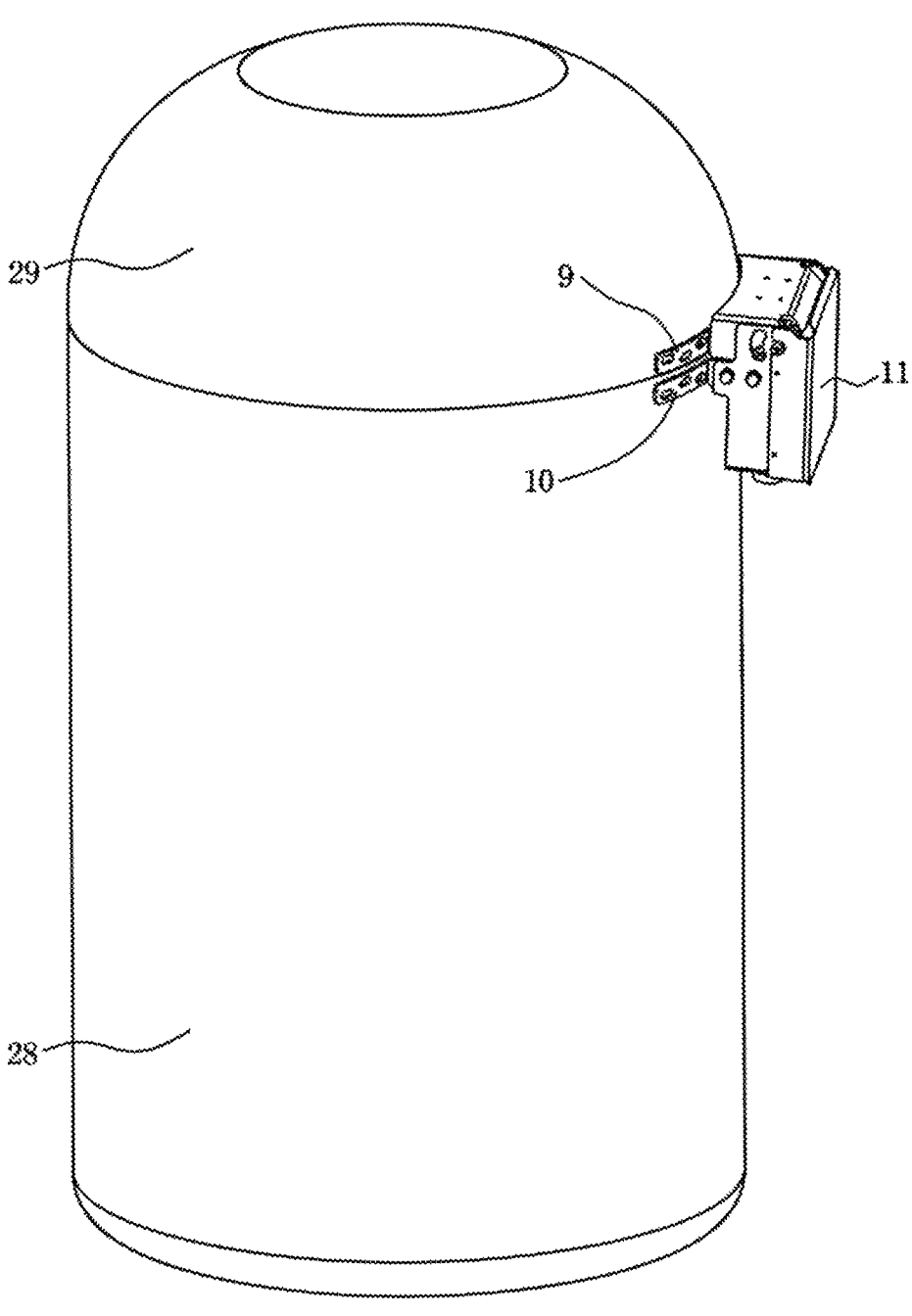
FIG. 11 is a schematic perspective view of a ceramic grill with a hinge structure.
Figure 12:
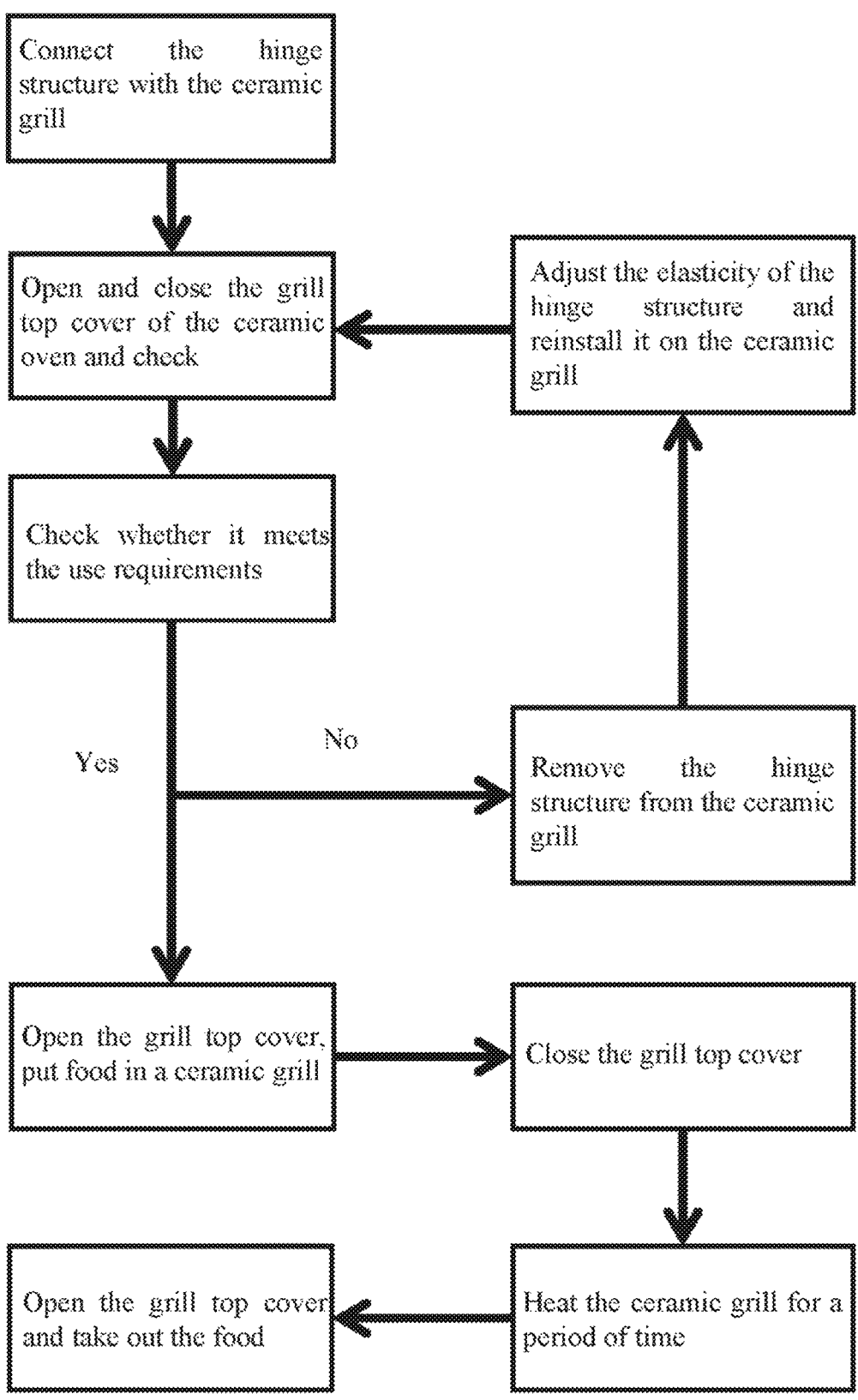
FIG. 12 shows the use steps of the hinge structure and the ceramic grill.

The hinge lower cover 2 is provided with an adjusting and supporting mechanism corresponding to the supporting shaft 13. The adjusting and supporting mechanism includes a spring base 21 arranged at the bottom of the hinge lower cover 2 and an adjusting shaft 15 arranged in the spring base 21. A supporting part 16 is arranged at one end of the adjusting shaft 15 close to the supporting shaft 13, and an end of the adjusting shaft 15 far from the supporting shaft 13 passes through the bottom of the hinge lower cover 2. One end of the adjusting shaft 15 far from the supporting shaft 13 is provided with a safety nut 24, a gland 20 is provided below the supporting part 16, and an elastic member 19 is telescopically provided between the spring base 21 and the gland 20. As shown in FIG. 7, in this embodiment, the elastic member 19 is an ordinary spring among mechanical springs. This kind of mechanical spring has excellent elasticity and durability, and can provide a stable buffer for the system. In other embodiments, the elastic member 19 can adopt other types of elastic elements, such as electromagnetic spring, air spring or hydraulic spring. These elastic elements have their own unique advantages and applicable scenarios. For example, the electromagnetic spring can keep a fixed shape when the power is cut off, which is suitable for occasions that need to keep a fixed shape; the air spring has excellent sound insulation and shock absorption performance, which is suitable for systems that need quietness and stability; the hydraulic spring has a strong ability of buffering and absorbing energy, which is suitable for occasions with large impact force. When selecting the elastic member 19, it should be considered according to the specific application scenarios and performance requirements, so as to ensure that the most suitable elastic member is selected to achieve the purpose of the present invention. The elastic member 19 can also be made of other elastic members such as elastic sheets.

The supporting shaft 13 is provided with a rotatable shaft sleeve 14 corresponding to the supporting part, and the supporting part is provided with a limiting groove 17 corresponding to the shaft sleeve 14, and the shaft sleeve 14 is located in the limiting groove 17. Because the supporting shaft 13 is limited by both sides of the hinge upper cover 1, the shaft sleeve 14 can limit the horizontal lateral movement of the limiting groove 17, thereby limiting the horizontal lateral displacement of the elastic member 19. Because the shaft sleeve 14 can rotate, the friction coefficient is reduced during the opening and closing of the hinge structure, the noise is reduced, and the use experience of the hinge structure is improved.

An adjusting nut 18 is arranged between the gland 20 and the supporting part 16, and there are threads on the adjusting shaft 15. The adjusting nut 18 can be movably connected to the adjusting shaft 15 vertically, and the position of the gland 20 is limited by the adjusting nut 18 so as to adjust the elastic force of the elastic member 19.

By adjusting the elastic force of the elastic member 19, the upper part of the grill can suspend at any angle within the opening and closing angle range of the hinge structure when the ceramic grill is opened and closed, without additional external force, and the upper part of the grill will not fall due to its own weight after being released, which greatly improves the use experience of the grill, and the hinge structure can be adapted to grills with different weights through different degrees of adjustment.

In this embodiment, the entire shaft of the adjusting shaft 15 is threaded.

In another embodiment, a part of the shaft body of the adjusting shaft 15 is threaded, so that the movable range of the adjusting nut 18 is limited, and the strength of the adjusting shaft 15 can also be enhanced.

The hinge upper cover 1 is provided with an upper stopper 110, and a plane with a largest area of the upper stopper 110 close to the upper connecting arm 10 is defined as a reverse side, and a plane with a largest area of the upper stopper 110 far from the upper connecting arm 10 is defined as a front side, and the upper stopper 110 covers the supporting shaft 113 when viewed in a direction perpendicular to the front side of the upper stopper 110 and from the front side of the upper stopper 110 toward the reverse side of the upper stopper 110. The main function of the upper stopper 110 is to support and protect. On the one hand, the upper stopper 110 can improve the strength of the hinge structure. On the other hand, the cover of the upper stopper 110 on the supporting shaft 13 can effectively prevent people from accidentally touching the supporting shaft 13 when the hinge structure works, resulting in accidental injuries.

The two sides of the hinge lower cover 2 are also fixedly connected with a protective cover 11, and the two sides of the hinge lower cover 2 are provided with first protective cover mounting holes 71, and the two sides of the protective cover 11 are provided with second protective cover mounting holes 72 corresponding to the hinge lower cover 2, and connectors simultaneously pass through the first protective cover mounting hole 71 and the second protective cover mounting hole 72 to connect the hinge lower cover 2 with the protective cover 11. The protective cover 11 covers the adjusting and supporting mechanism, which can effectively prevent people from accidentally touching the elastic member 19 with elasticity in the adjusting and supporting mechanism when the hinge structure works, which may result in accidental injuries.

A reinforcing pad 23 is provided between the hinge lower cover 2 and the spring base 21. The reinforcing pad 23 has a wider width and a longer length than the spring base 21, and also has a larger bottom area than the bottom surface of the spring base 21, which can disperse the pressure on the spring base 21 and improve the strength and safety of the hinge structure.

The spring base 21 has an inverted T-shaped outer contour, and the spring base 21 has a penetrating through-hole

211, the adjusting shaft 15 is between the through holes 211, and the through-hole 211 can limit the elastic member 19. The spring base 21 is provided with a spring limiting groove 22, which limits the elastic member 19, and a first base fastening hole 212. The bottom of the hinge lower cover 2 is provided with a second base fastening hole 214 corresponding to the first base fastening hole 212, and a base fastener 213 passes through the first base fastening hole 212 and the second base fastening hole 214 to fix the spring base 21 on the hinge lower cover 2.

The inner diameter of the circumferential outer edge of the gland 20 is larger than the outer diameter of the elastic member 19, and thus the gland 20 can well limit the radial movement of the upper part of the elastic member 19. The outer diameter of the base through hole 211 of the spring base 21 is smaller than the inner diameter of the elastic member 19, and the inner diameter of the spring limiting groove 22 is larger than the outer diameter of the elastic member 19, therefore the spring base 21 can well limit the radial movement of the lower part of the elastic member 19. The bottom of the hinge lower cover 2 is provided with an adjusting shaft through hole 6, and the adjusting shaft 15 passes through the adjusting shaft through hole 6. The maximum diameter of the safety nut 24 is larger than that of the adjusting shaft through hole 6, therefore the safety nut 24 can prevent the adjusting shaft 15 from escaping from the adjusting shaft through hole 6 of the hinge lower cover 2 in extreme cases.

As shown in FIGS. 4 to 6, 9 and 10, in another embodiment, the hinge structure includes a hinge lower cover 2 and a hinge upper cover 1, and the hinge upper cover 1 is rotatably connected to the hinge lower cover 2 through a hinge connector 8, the hinge lower cover 2 is provided with an upper cover connecting hole 4, and the hinge connector 8 includes a connecting bolt 81, a connecting nut 82, a flat pad 84 and a spring pad 83. The connecting nut 82 is inside the hinge lower cover 2, the connecting bolt 81 is outside the hinge lower cover 2, and the flat pad 84 and the spring pad 83 are arranged between the connecting nut 82 and the inner side of the hinge lower cover 2.

The two sides of the hinge lower cover 2 are symmetrically provided with lower connecting arms 9, and the two sides of the hinge upper cover 1 are provided with upper connecting arms 10 corresponding to the lower connecting arms 9.

The lower connecting arm 9 and the hinge lower cover 2 are connected through a lower arm fastening nut 91 and a lower arm fastening bolt 92. The lower connecting arm 9 is provided with a lower arm adjusting hole 27 which is a rectangular through hole, and the hinge lower cover 2 is provided with the lower arm mounting hole 5 which is a circular through hole.

The width of the lower arm adjusting hole 27 is larger than that of the lower arm mounting hole 5, and the lower connecting arm 9 can be moved and adjusted in the width direction of the lower arm adjusting hole 27 by loosening the lower arm fastening bolt 92 and the lower arm fastening nut 91 to adapt to ceramic grills with different sizes and shapes.

An upper connecting arm 10 is provided with at least three first grill connecting holes 251, and the center points of all the first grill connecting holes 251 on an upper connecting arm 10 are not on the same straight line. A lower connecting arm 9 is provided with at least three second grill connecting holes 252, and the center points of all the second grill connecting holes 252 on a lower connecting arm 9 are not on the same straight line. The first grill connecting hole 251 and the second grill connecting hole 252 can be used to connect the hinge structure with the ceramic grill. The first grill connecting hole 251 is used to connect the upper cover of the ceramic grill, and the second grill connecting hole 252 is used to connect the lower part of the ceramic grill. The opening and closing of the hinge structure drives the opening and closing of the upper cover and the lower part of the ceramic grill. An upper connecting arm 10 has three first grill connecting holes 251, the center points of which form an inverted triangle, while a lower connecting arm 9 has three second grill connecting holes 252, and the center points of the three second grill connecting holes 252 form a triangle.

Both sides of the hinge lower cover 2 are provided with arc-shaped grooves 3, and the hinge upper cover 1 is internally provided with a supporting shaft 13 corresponding to the arc-shaped grooves 3. Both ends of the supporting shaft 13 are provided with supporting shaft nuts 26 which are located in the arc-shaped grooves 3, and the maximum opening and closing angle of the hinge lower cover 2 and the hinge upper cover 1 is limited by the arc-shaped grooves 3.

Because the arc-shaped groove 3 is arranged on both sides of the hinge lower cover 2, it is easy to see the arc-shaped groove 3, and it can be clearly known whether the hinge structure has reached the maximum opening and closing angle and can not be further opened and closed, and it can also be found in time when the arc-shaped groove 3 has structural damage, thus improving the use experience and safety. The opening and closing angle range of the hinge structure is 0-60 degrees.

The hinge lower cover 2 is provided with an adjusting and supporting mechanism corresponding to the supporting shaft 13, which includes a spring base 21 arranged at the bottom of the hinge lower cover 2 and an adjusting shaft 15 arranged in the spring base 21. A supporting part 16 is arranged at one end of the adjusting shaft 15 close to the supporting shaft 13, and an end of the adjusting shaft 15 far from the supporting shaft 13 passes through the bottom of the hinge lower cover 2. One end of the adjusting shaft 15 far from the supporting shaft 13 is provided with a safety nut 24, a gland 20 is provided below the supporting part 16, and an elastic member 19 is telescopically provided between the spring base 21 and the gland 20.

An adjusting nut 18 is arranged between the gland 20 and the supporting part 16, and there are threads on the adjusting shaft 15. The adjusting nut 18 can be movably connected to the adjusting shaft 15 vertically, and the position of the gland 20 is limited by the adjusting nut 18 so as to adjust the elastic force of the elastic member 19.

In another embodiment, the adjusting nut 18 and the gland 20 are integrated.

By adjusting the elastic force of the elastic member 19, the upper part of the grill can suspend at any angle within the opening and closing angle range of the hinge structure when the ceramic grill is opened and closed, without additional external force, and the upper part of the grill will not fall due to its own weight after being released, which greatly improves the use experience of the grill. However, through different degrees of adjustment, the hinge structure can also adapt to grills with different weights, and the whole shaft body of the adjusting shaft 15 has threads.

In another embodiment, a part of the shaft body of the adjusting shaft 15 is threaded, so that the movable range of the adjusting nut 18 is limited, and the strength of the adjusting shaft 15 can also be enhanced.

In another embodiment, the hinge structure can be electrically opened and closed by adding electric control, such as adding a control structure of motor and gear.

The hinge upper cover 1 is provided with an upper stopper 110, and a plane with a largest area of the upper stopper 110 close to the upper connecting arm 10 is defined as a reverse side, and a plane with a largest area of the upper stopper 110 far from the upper connecting arm 10 is defined as a front side, and the upper stopper 110 covers the supporting shaft 113 when viewed in a direction perpendicular to the front side of the upper stopper 110 and from the front side of the upper stopper 110 toward the reverse side of the upper stopper 110. The main function of the upper stopper 110 is to support and protect. On the one hand, the upper stopper 110 can improve the strength of the hinge structure. On the other hand, the cover of the upper stopper 110 on the supporting shaft 13 can effectively prevent people from accidentally touching the supporting shaft 13 when the hinge structure works, resulting in accidental injuries.

The two sides of the hinge lower cover 2 are also fixedly connected with protective covers 11, and the two sides of the hinge lower cover 2 are provided with first protective cover mounting holes 71. The two sides of the protective cover 11 are provided with second protective cover mounting holes 72 corresponding to the hinge lower cover 2, and connectors simultaneously pass through the first protective cover mounting hole 71 and the second protective cover mounting hole 72 to connect the hinge lower cover 2 with the protective cover 11. The protective cover 11 covers the adjusting and supporting mechanism, which can effectively prevent people from accidentally touching the elastic member 19 with elasticity in the adjusting and supporting mechanism when the hinge structure works, resulting in accidental injuries.

A reinforcing pad 23 is provided between the hinge lower cover 2 and the spring base 21. The reinforcing pad 23 has a wider width and a longer length than the spring base 21, and also has a larger bottom area than the bottom surface of the spring base 21, which can disperse the pressure on the spring base 21 and improve the strength and safety of the hinge structure.

The spring base 21 has an inverted T-shaped outer contour, and the spring base 21 has a penetrating through-hole 211, the adjusting shaft 15 is between the through-holes 211, and the through-hole 211 can limit the elastic member 19. The base is provided with a spring limiting groove 22, which limits the elastic member 19, and a first base fastening hole 212. The bottom of the hinge lower cover 2 is provided with a second base fastening hole 214 corresponding to the first base fastening hole 212, and a base fastener 213 passes through the first base fastening hole 212 and the second base fastening hole 214 to fix the spring base 21 on the hinge lower cover 2.

As shown in FIGS. 1 to 8 and 11, the present invention also provides a ceramic grill, which includes a grill body 28, a grill top cover 29, and a hinge structure connecting the grill body 28 and the grill top cover 29.

The hinge structure includes a hinge lower cover 2 and a hinge upper cover 1, wherein the hinge lower cover 2 is connected with the grill body 28 and the hinge upper cover 1 is connected with the grill top cover 29; the hinge upper cover 1 is rotatably connected with the hinge lower cover 2 through a hinge connector 8, and the hinge connector 8 includes a connecting bolt 81, a connecting nut 82, a flat pad 84 and a spring pad 83.

In this embodiment, the connecting nut 82 is inside the hinge lower cover 2, the connecting bolt 81 is outside the hinge lower cover 2, and the flat pad 84 and the spring pad 83 are arranged between the connecting nut 82 and the inside of the hinge lower cover 2.

In another embodiment, the connecting nut 82 is outside the hinge lower cover 2, the connecting bolt 81 is inside the hinge lower cover 2, and the flat pad 84 and the spring pad 83 are arranged between the connecting nut 82 and the outside of the hinge lower cover 2.

In another embodiment, the connecting nut 82 is inside the hinge lower cover 2, the connecting bolt 81 is outside the hinge lower cover 2, and the flat pad 84 and the spring pad 83 are arranged between the connecting bolt 81 and the outside of the hinge lower cover 2.

In another embodiment, the connecting nut 82 is outside the hinge lower cover 2, the connecting bolt 81 is inside the hinge lower cover 2, and the flat pad 84 and the spring pad 83 are arranged between the connecting nut 82 and the outside of the hinge lower cover 2.

In this embodiment, two sides of the hinge lower cover 2 are symmetrically provided with lower connecting arms 9, and two sides of the hinge upper cover 1 are provided with upper connecting arms 10 corresponding to the lower connecting arms 9. The width of both sides of the hinge upper cover 1 is smaller than that of the hinge lower cover 2, and the hinge upper cover 1 is partially covered by the hinge lower cover 2, so that when the lower connecting arm 9 and the upper connecting arm 10 are in the closest position to each other, the lower connecting arm 9 and the upper connecting arm 10 are on the same plane. Therefore, in structural design, the upper and lower connecting arms 9 and 10 have similar shapes, which are close to the fitting degree and installation position of the grill and more convenient for production and installation.

In another embodiment, the two lower connecting arms 9 are connected from the left side to the right side and integrated, and the two upper connecting arms 10 are connected from the left side to the right side and integrated corresponding to the lower connecting arms 9.

The lower connecting arm 9 and the hinge lower cover 2 are connected with a lower arm fastening nut 91 through a lower arm fastening bolt 92. The lower connecting arm 9 is provided with a lower arm adjusting hole 27 which is a rectangular through hole, and the hinge lower cover 2 is provided with the lower arm mounting hole 5 which is a circular through hole.

In this embodiment, the width of the lower arm adjusting hole 27 is larger than that of the lower arm mounting hole 5, so the lower connecting arm 9 can be moved and adjusted in the width direction of the lower arm adjusting hole 27 by loosening the lower arm fastening bolt 92 and the lower arm fastening nut 91 to adapt to ceramic grills with different sizes and shapes.

In another embodiment, the width of the lower arm mounting hole 5 is larger than that of the lower arm adjusting hole 27, so the lower connecting arm 9 can be moved and adjusted in the width direction of the lower arm mounting hole 5 by loosening the lower arm fastening bolt 92 and the lower arm fastening nut 91 to adapt to ceramic grills with different sizes and shapes.

In another embodiment, the width of the lower arm adjusting hole 27 is larger than that of the lower arm mounting hole 5, and the lower arm adjusting hole 27 is a rectangular through hole, and the lower arm mounting hole 5 is also a rectangular through hole. Therefore, by loosening the lower arm fastening bolt 92 and the lower arm fastening nut 91, the lower connecting arm 9 can be moved and adjusted in the width direction of the lower arm adjusting hole 27 to adapt to ceramic grills with different sizes and shapes.

In another embodiment, the width of the lower arm adjusting hole 27 is larger than that of the lower arm mounting hole 5, and the lower arm adjusting hole 27 is a circular through hole, and the lower arm mounting hole 5 is also a circular through hole. Therefore, by loosening the lower arm fastening bolt 92 and the lower arm fastening nut 91, the lower connecting arm 9 can be moved and adjusted in the width direction of the lower arm adjusting hole 27 to adapt to ceramic grills with different sizes and shapes.

An upper connecting arm 10 is provided with at least three first grill connecting holes 251, and the center points of all the first grill connecting holes 251 on an upper connecting arm 10 are not on the same straight line. A lower connecting arm 9 is provided with at least three second grill connecting holes 252, and the center points of all the second grill connecting holes 252 on a lower connecting arm 9 are not on the same straight line. The first grill connecting hole 251 and the second grill connecting hole 252 can be used to connect the hinge structure with the ceramic grill. The first grill connecting hole 251 is used to connect the upper cover of the ceramic grill, and the second grill connecting hole 252 is used to connect with the grill body 28. The opening and closing of the hinge structure drives the opening and closing of the upper cover 29 of the ceramic grill and the grill body 28.

In this embodiment, an upper connecting arm 10 has three first grill connecting holes 251, the center points of which form an inverted triangle, while a lower connecting arm 9 has three second grill connecting holes 252, and the center points of the three second grill connecting holes 252 form a triangle.

In another embodiment, an upper connecting arm 10 has three first grill connecting holes 251, and the center points of the three first grill connecting holes 251 form an inverted triangle, while a lower connecting arm 9 has three second grill connecting holes 252, and the center points of the three second grill connecting holes 252 form an inverted triangle.

In another embodiment, an upper connecting arm 10 has three first grill connecting holes 251, and the center points of the three first grill connecting holes 251 form a triangle, while a lower connecting arm 9 has three second grill connecting holes 252, and the center points of the three second grill connecting holes 252 form an inverted triangle.

In another embodiment, an upper connecting arm 10 has three first grill connecting holes 251, and the center points of the three first grill connecting holes 251 form a triangle, while a lower connecting arm 9 has three second grill connecting holes 252, and the center points of the three second grill connecting holes 252 form a triangle.

Both sides of the hinge lower cover 2 are provided with arc-shaped grooves 3, and the hinge upper cover 1 is internally provided with a supporting shaft 13 corresponding to the arc-shaped grooves 3. Both ends of the supporting shaft 13 are provided with supporting shaft nuts 26 which are located in the arc-shaped grooves 3, and the maximum opening and closing angle of the hinge lower cover 2 and the hinge upper cover 1 is limited by the arc-shaped grooves 3. A reinforcing beam 12 is connected between the supporting shaft 13 and the hinge upper cover 1, which can disperse the pressure of the supporting shaft 13 on the hinge upper cover 1 and improve the strength and safety of the hinge structure.

Because the arc-shaped groove 3 is arranged on both sides of the hinge lower cover 2, it is easy to see the arc-shaped groove 3, and it can be clearly known whether the hinge structure has reached the maximum opening and closing angle and can not be further opened and closed, and it can also be found in time when the arc-shaped groove 3 has structural damage, thus improving the use experience and safety.

In this embodiment, the opening and closing angle of the hinge structure is 0-60 degrees.

The hinge lower cover 2 is provided with an adjusting and supporting mechanism corresponding to the supporting shaft 13. The adjusting and supporting mechanism includes a spring base 21 arranged at the bottom of the hinge lower cover 2 and an adjusting shaft 15 arranged in the spring base 21. A supporting part 16 is arranged at one end of the adjusting shaft 15 close to the supporting shaft 13, and an end of the adjusting shaft 15 far from the supporting shaft 13 passes through the bottom of the hinge lower cover 2. One end of the adjusting shaft 15 far from the supporting shaft 13 is provided with a safety nut 24, a gland 20 is provided below the supporting part 16, and an elastic member 19 is telescopically provided between the spring base 21 and the gland 20.

The supporting shaft 13 is provided with a rotatable shaft sleeve 14 corresponding to the supporting part, and the supporting part is provided with a limiting groove 17 corresponding to the shaft sleeve 14, and the shaft sleeve 14 is located in the limiting groove 17. Because the supporting shaft 13 is limited by both sides of the hinge upper cover 1, the shaft sleeve 14 can limit the horizontal lateral movement of the limiting groove 17, thereby limiting the horizontal lateral displacement of the elastic member 19. Because the shaft sleeve 14 can rotate, the friction coefficient is reduced during the opening and closing of the hinge structure, the noise is reduced, and the use experience of the hinge structure is improved.

An adjusting nut 18 is arranged between the gland 20 and the supporting part 16, and there are threads on the adjusting shaft 15. The adjusting nut 18 can be movably connected to the adjusting shaft 15 vertically, and the position of the gland 20 is limited by the adjusting nut 18 so as to adjust the elastic force of the elastic member 19.

By adjusting the elastic force of the elastic member 19, the effect of suspending at any angle within the opening and closing angle range of the hinge structure can be achieved when the grill top cover 29 is opened and closed, without additional external force, and the grill top cover 29 will not fall due to its own weight after being released, which greatly improves the use experience of the grill, and the hinge structure can be adapted to grills with different weights through different degrees of adjustment.

In this embodiment, the entire shaft of the adjusting shaft 15 is threaded.

In another embodiment, a part of the shaft body of the adjusting shaft 15 is threaded, so that the movable range of the adjusting nut 18 is limited, and the strength of the adjusting shaft 15 can also be enhanced.

The hinge upper cover 1 is provided with an upper stopper 110, and a plane with a largest area of the upper stopper 110 close to the upper connecting arm 10 is defined as a reverse side, and a plane with a largest area of the upper stopper 110 far from the upper connecting arm 10 is defined as a front side, and the upper stopper 110 covers the supporting shaft 113 when viewed in a direction perpendicular to the front side of the upper stopper 110 and from the front side of the upper stopper 110 toward the reverse side of the upper stopper 110. The main function of the upper stopper 110 is to support and protect. On the one hand, the upper stopper 110 can improve the strength of the hinge structure. On the other hand, the cover of the upper stopper 110 on the supporting shaft 13 can effectively prevent people from accidentally touching the supporting shaft 13 when the hinge structure works, resulting in accidental injuries.

The two sides of the hinge lower cover 2 are also fixedly connected with protective covers 11, and the two sides of the hinge lower cover 2 are provided with first protective cover mounting holes 71, and the two sides of the protective cover 11 are provided with second protective cover mounting holes 72 corresponding to the hinge lower cover 2, and connectors simultaneously pass through the first protective cover mounting hole 71 and the second protective cover mounting hole 72 to connect the hinge lower cover 2 with the protective cover 11. The protective cover 11 covers the adjusting and supporting mechanism, which can effectively prevent people from accidentally touching the elastic member 19 with elasticity in the adjusting and supporting mechanism when the hinge structure works, resulting in accidental injuries.

A reinforcing pad 23 is provided between the hinge lower cover 2 and the spring base 21. The reinforcing pad 23 has a wider width and a longer length than the spring base 21, and also has a larger bottom area than the bottom surface of the spring base 21, which can disperse the pressure on the spring base 21 and improve the strength and safety of the hinge structure.

The spring base 21 has an inverted T-shaped outer contour, and the spring base 21 has a penetrating through-hole 211, the adjusting shaft 15 is between the through-holes 211, and the through-hole 211 can limit the elastic member 19, and the spring base 21 is provided with a spring limiting groove 22, which limits the elastic member 19, and a first base fastening hole 212. The bottom of the hinge lower cover 2 is provided with a second base fastening hole 214 corresponding to the first base fastening hole 212, and a base fastener 213 passes through the first base fastening hole 212 and the second base fastening hole 214 to fix the spring base 21 on the hinge lower cover 2.

The inner diameter of the circumferential outer edge of the gland 20 is larger than the outer diameter of the elastic member 19, and the gland 20 can well limit the radial movement of the upper part of the elastic member 19. The outer diameter of the base through hole 211 of the spring base 21 is smaller than the inner diameter of the elastic member 19, and the inner diameter of the spring limiting groove 22 is larger than the outer diameter of the elastic member 19, therefore the spring base 21 can well limit the radial movement of the lower part of the elastic member 19. The bottom of the hinge lower cover 2 is provided with an adjusting shaft through hole 6, and the adjusting shaft 15 passes through the adjusting shaft through hole 6. The maximum diameter of the safety nut 24 is larger than that of the adjusting shaft through hole 6, and thus the safety nut 24 can prevent the adjusting shaft 15 from escaping from the adjusting shaft through hole 6 of the hinge lower cover 2 in extreme cases.

As shown in FIGS. 1 to 12, the present invention also provides a cooking method, which includes providing a ceramic grill, which includes a grill body 28, a grill top cover 29, and a hinge structure connecting the grill body 28 and the grill top cover 29; and wherein the hinge structure includes a hinge upper cover 1, a hinge lower cover 2 rotatably engaged with the hinge upper cover 1, and an adjusting and supporting mechanism arranged between the hinge upper cover 1 and the hinge lower cover 2; and wherein, the hinge lower cover 2 includes at least one lower connecting arm 9, and the adjusting and supporting mechanism includes an adjusting component and an elastic member 19, wherein the adjusting component includes an adjusting shaft 15 with a threaded part and an adjusting member arranged on the adjusting shaft 15, wherein the adjusting shaft 15 further includes a supporting part 16, and the adjusting member includes an adjusting nut 18 and a gland 20 arranged below the adjusting nut 18; and wherein the adjusting member is operable to change the elastic force of the elastic member 19; and wherein the hinge structure is detachably attached to the grill top cover 29 through the upper connecting arm 10, and the hinge structure is detachably attached to the grill body 28 through the lower connecting arm 9.

The barbecue method includes the following steps:

connecting the hinge structure with the ceramic grill, specifically, connecting the upper connecting arm 10 of the hinge structure to the grill top cover 29 of the ceramic grill, connecting the lower connecting arm 9 of the hinge structure to the ceramic grill body 28, opening the grill top cover 29 to the maximum position, and closing the grill top cover 29 to make the grill top cover 29 adhere to the grill body 28; checking that the opening and closing process of the ceramic grill is smooth, wherein if the grill top cover 29 is open and closed smoothly, and the grill top cover 29 can remain static at any position within the maximum opening and closing range of the hinge structure without external force, it means that the elasticity of the hinge structure is appropriate and does not need to be adjusted; directly opening the grill top cover 29, putting food into the ceramic grill, heating the ceramic grill by making the inside of the ceramic grill generate high temperature, closing the grill top cover 29, making the grill top cover 29 adhere to the grill body 28, and opening the grill top cover 29 after heating for a certain period of time to take out the food.

When the grill top cover 29 is opened, and he opening and closing angle of the grill top cover 29 automatically increases or it is difficult to move in the closing direction, it indicates that the elasticity of the hinge structure is too large.

If the grill top cover 29 automatically falls down after the grill top cover 29 is opened, it means that the elasticity of the hinge structure is too small.

If the elastic force is too large or too small, the elastic force of the hinge structure can be adjusted, and the elastic force of the hinge structure can be changed by changing the position of the adjusting member on the adjusting shaft 15.

When the distance between the adjusting member and the supporting part 16 is shorter, the compression degree of the elastic member 19 is greater, and the elasticity of the hinge structure is greater.

When the distance between the adjusting member and the supporting part 16 is longer, the compression degree of the elastic member 19 is smaller, and the elasticity of the hinge structure is smaller.

During adjustment, the hinge structure can be detached from the ceramic grill first, and the distance between the adjusting part and the supporting part 16 can be changed by using tools. Then, the hinge structure can be connected with the ceramic grill to check that the opening and closing process of the ceramic grill is smooth. The grill top cover 29 can suspend at any position within the opening and closing range of the hinge structure, and the adjustment can be continued if it fails to meet the requirements.

In another embodiment, by using a suitable tool, the distance between the adjusting member and the supporting part 16 can be directly adjusted without detaching the hinge structure from the ceramic grill during adjustment, and the hinge structure does not need to be reinstalled after adjustment, which is more convenient and quick.

When the adjustment is completed, the ceramic grill is opened, the grill top cover 29 is opened, food is put into the ceramic grill, the ceramic grill is heated by making the inside of the ceramic grill generate a high temperature, the grill top cover 29 is closed, and the grill top cover 29 is adhered to the grill body 28. After heating for a certain time, the grill top cover 29 is opened to take out the food.

There are two main ways to generate the high temperature, one is through the combustion of fuel, and the other is through electromagnetic heating. In the ceramic grill, carbon, alcohol and other heat energy providers may be put to achieve the purpose of heating up. During the combustion process, fuels such as carbon and alcohol will release a lot of heat, which will be transferred to the air and objects in the grill to raise their temperature.

Fuel such as carbon or alcohol is put into a ceramic grill and then the fuel is ignited, which will release a lot of heat energy during the combustion process. This heat energy can be transferred by conduction, convection and radiation. Conduction refers to the direct transfer of heat from high-temperature fuel to objects in the grill; convection means that heat is transferred to objects through the air flow in the grill; radiation refers to the transfer of heat to the surrounding objects in the form of electromagnetic waves. These three ways work together to make the temperature in the grill rise rapidly.

Electromagnetic heating is the use of electric current to generate a magnetic field under certain conditions, which in turn makes the metal conductor generate heat. In the ceramic grill, an electromagnetic heating device may be installed to generate a magnetic field in the metal conductor through current, so that the conductor heats up, and then the temperature of the grill is increased. The advantages of this heating method are rapid heat generation, high heating efficiency, no open flame and more safety and reliability.

In short, in order to produce high temperature, we can choose fuel combustion or electromagnetic heating. In practical application, the appropriate heating mode can be selected according to the specific needs and conditions. Both fuel combustion and electromagnetic heating need to pay attention to safety measures to ensure the stability and reliability of high temperature environment. In the heating process of ceramic grill, reasonable use of these two ways can make people get better experience in cooking and baking.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A ceramic grill hinge structure, comprising a hinge upper cover, a hinge lower cover rotatably engaged with said hinge upper cover, and an adjusting and supporting mechanism arranged between said hinge upper cover and said hinge lower cover; and wherein, said hinge upper cover comprises a supporting shaft, at least one rotatable shaft sleeve is arranged on said supporting shaft, and said hinge lower cover is provided with at least two arc-shaped grooves, and said two arc-shaped grooves receive the two ends of said supporting shaft and allow the two ends of said supporting shaft to move therein; and wherein said adjusting and supporting mechanism comprises an adjusting component and an elastic member, wherein said adjusting component comprises an adjusting shaft with a threaded part and an adjusting member arranged on said adjusting shaft, wherein said adjusting shaft further comprises a supporting part, wherein one end of said elastic member is pressed against said adjusting member, and the other end of said elastic member is pressed against said hinge lower cover; and wherein, said supporting part is provided with a limiting groove which receives and supports said shaft sleeve, and said adjusting member is operable to change an elastic force of said elastic member.

2. The ceramic grill hinge structure according to claim 1, wherein said hinge lower cover is provided with at least one lower connecting arm; and said hinge upper cover is provided with at least one upper connecting arm corresponding to said lower connecting arm; and said lower connecting arm and said hinge lower cover are connected through a lower arm fastening nut and a lower arm fastening bolt; and said lower connecting arm is provided with a lower arm adjusting hole which is a rectangular through hole; and said hinge lower cover is provided with a lower arm mounting hole; and said lower arm mounting hole is a circular through hole; and the two ends of said supporting shaft are provided with supporting shaft nuts which are located in said arc-shaped grooves, and maximum opening and closing angles of said hinge lower cover and said hinge upper cover are limited by said arc-shaped grooves; and said adjusting and supporting mechanism comprises a spring base arranged at a bottom of said hinge lower cover, and said adjusting shaft is arranged in said spring base; and an end of said adjusting shaft far away from said supporting shaft penetrates the bottom of said hinge lower cover, the end of said adjusting shaft far away from said supporting shaft is provided with a safety nut; and said adjusting member comprises an adjusting nut arranged below said supporting part and a gland arranged below said adjusting nut, and said elastic member is retractable between said spring base and said gland.

3. The ceramic grill hinge structure according to claim 2, wherein said hinge upper cover is provided with an upper stopper, and a plane with a largest area of said upper stopper close to said upper connecting arm is defined as a reverse side, and a plane with a largest area of said upper stopper far from said upper connecting arm is defined as a front side, and said upper stopper covers said supporting shaft when viewed in a direction perpendicular to said front side of said upper stopper and from the front side of said upper stopper toward the reverse side of said upper stopper.

4. The ceramic grill hinge structure according to claim 2, wherein two sides of said hinge lower cover are also fixedly connected with protective covers, and the two sides of said hinge lower cover are provided with first protective cover mounting holes, and two sides of said protective cover are provided with second protective cover mounting holes corresponding to said hinge lower cover; and connectors pass through both said first protective cover mounting holes and said second protective cover mounting holes to connect said hinge lower cover and said protective covers.

5. The ceramic grill hinge structure according to claim 2, wherein a reinforcing pad is arranged between said hinge lower cover and said spring base.

6. The ceramic grill hinge structure according to claim 2, wherein one upper connecting arm is provided with at least three first grill connecting holes, and center points of all said first grill connecting holes on one upper connecting arm are not on a same straight line; and one lower connecting arm is provided with at least three second grill connecting holes, and center points of all said second grill connecting holes on one lower connecting arm are not on a same straight line.

7. The ceramic grill hinge structure according to claim 2, wherein said spring base has an inverted T-shaped outer contour, said spring base has a penetrating base through-hole, and is provided with a spring limiting groove which limits said elastic member; and said spring base is provided with a first base fastening hole, and a bottom of said hinge lower cover is provided with a second base fastening hole corresponding to said first base fastening hole, and a base fastener passes through the first base fastening hole and the second base fastening hole to fix the spring base on the hinge lower cover.

8. A ceramic grill, comprising a grill body, a grill top cover, and a hinge structure connecting said grill body and said grill top cover; and wherein, said hinge structure comprises a hinge upper cover, a hinge lower cover rotatably engaged with said hinge upper cover, and an adjusting and supporting mechanism arranged between said hinge upper cover and said hinge lower cover; and wherein, said hinge upper cover comprises a supporting shaft and at least one upper connecting arm, at least one rotatable shaft sleeve is arranged on said supporting shaft, and said hinge lower cover comprises at least one lower connecting arm and is provided with at least two arc-shaped grooves, and said two arc-shaped grooves receive the two ends of said supporting shaft and allow the two ends of said supporting shaft to move therein; and wherein said adjusting and supporting mechanism comprises an adjusting component and an elastic member, wherein said adjusting component comprises an adjusting shaft with a threaded part and an adjusting member arranged on said adjusting shaft, wherein said adjusting shaft further comprises a supporting part, wherein one end of said elastic member is pressed against said adjusting member, and the other end of said elastic member is pressed against said hinge lower cover; and wherein, said supporting part is provided with a limiting groove which receives and supports said shaft sleeve, and said adjusting member is operable to change an elastic force of said elastic member; and wherein, said hinge structure is detachably attached to said grill top cover through said upper connecting arm, and said hinge structure is detachably attached to said grill body through said lower connecting arm.

9. The ceramic grill according to claim 8, wherein said lower connecting arm and said hinge lower cover are connected with a lower arm fastening nut and a lower arm fastening bolt, and said lower connecting arm is provided with a lower arm adjusting hole which is a rectangular through hole, and said hinge lower cover is provided with said lower arm mounting hole which is a circular through hole; and two ends of said supporting shaft are provided with supporting shaft nuts which are located in said arc-shaped grooves, and maximum opening and closing angles of said hinge lower cover and said hinge upper cover are limited by said arc-shaped grooves; and said adjusting and supporting mechanism comprises a spring base arranged at a bottom of said hinge lower cover, and said adjusting shaft is arranged in said spring base; and an end of said adjusting shaft far away from said supporting shaft penetrates the bottom of said hinge lower cover, the end of said adjusting shaft far away from said supporting shaft is provided with a safety nut; and said adjusting member comprises an adjusting nut arranged below said supporting part and a gland arranged below said adjusting nut, and said elastic member is retractable between said spring base and said gland.

10. The ceramic grill according to claim 8, wherein said hinge upper cover is provided with an upper stopper, and a plane with a largest area of said upper stopper close to said upper connecting arm is defined as a reverse side, and a plane with a largest area of said upper stopper far from said upper connecting arm is defined as a front side, and said upper stopper said supporting shaft when viewed in a direction perpendicular to said front side of said upper stopper and from the front side of said upper stopper toward the reverse side of said upper stopper.

11. The ceramic grill according to claim 8, wherein two sides of said hinge lower cover are also fixedly connected with protective covers, and the two sides of said hinge lower cover are provided with first protective cover mounting holes, and two sides of said protective cover are provided with second protective cover mounting holes corresponding to said hinge lower cover; and connectors pass through both said first protective cover mounting holes and said second protective cover mounting holes to connect said hinge lower cover and said protective covers.

12. The ceramic grill according to claim 9, wherein a reinforcing pad is arranged between said hinge lower cover and said spring base.

13. The ceramic grill according to claim 8, wherein there are at least two upper connecting arms and at least two lower connecting arms; and one of said upper connecting arms is provided with at least three first grill connecting holes, and center points of all said first grill connecting holes on one of said upper connecting arms are not on a same straight line; and one of said lower connecting arms is provided with at least three second grill connecting holes, and center points of all said second grill connecting holes on one of said lower connecting arms are not on a same straight line.

14. The ceramic grill according to claim 9, wherein said spring base has an inverted T-shaped outer contour, said spring base has a penetrating base through-hole, and is provided with a spring limiting groove which limits said elastic member; and said spring base is provided with a first base fastening hole, and a bottom of said hinge lower cover is provided with a second base fastening hole corresponding to said first base fastening hole, and a base fastener passes through the first base fastening hole and the second base fastening hole to fix the spring base on the hinge lower cover.

15. The ceramic grill hinge structure according to claim 14, wherein a reinforcing beam is connected between said supporting shaft and said hinge upper cover, a width of two sides of said hinge upper cover is smaller than that of said hinge lower cover; and said hinge upper cover is partially covered by said hinge lower cover, an inner diameter of a circumferential outer edge of said gland is larger than that of said elastic member, an outer diameter of said base through hole of said spring base is smaller than that of said elastic member, and an inner diameter of said spring limiting groove is larger than an outer diameter of said elastic member; and the bottom of said hinge lower cover is provided with an adjusting shaft through hole, said adjusting shaft passes through said adjusting shaft through hole, and a maximum diameter of said safety nut is larger than that of said adjusting shaft through hole.

* * * * *